(12) United States Patent
Zavitz

(10) Patent No.: US 10,480,687 B2
(45) Date of Patent: *Nov. 19, 2019

(54) PIPE RACKS

(71) Applicant: Tindall Corporation, Spartanburg, SC (US)

(72) Inventor: Bryant A. Zavitz, Dunwoody, GA (US)

(73) Assignee: Tindall Corporation, Spartanburg, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/250,811

(22) Filed: Aug. 29, 2016

(65) Prior Publication Data

US 2016/0363241 A1  Dec. 15, 2016

Related U.S. Application Data

(63) Continuation of application No. 14/740,306, filed on Jun. 16, 2015, now Pat. No. 9,428,870, which is a
(Continued)

(51) Int. Cl.
*E02D 27/32* (2006.01)
*F16L 3/22* (2006.01)
(Continued)

(52) U.S. Cl.
CPC ............... *F16L 3/22* (2013.01); *E02D 27/02* (2013.01); *E02D 27/32* (2013.01); *E02D 27/46* (2013.01);
(Continued)

(58) Field of Classification Search
CPC ......... E02D 27/32; E02D 27/02; E02D 27/42; A47B 81/005; A47B 47/021; E04G 11/14;
(Continued)

(56) References Cited

U.S. PATENT DOCUMENTS 948,834 A   2/1910  Wagler
958,619 A   5/1910  Frazier
(Continued)

FOREIGN PATENT DOCUMENTS

FR   2724196 A1 *  3/1996  ......... E04H 12/2261
FR   2750723 A1 *  1/1998
(Continued)

OTHER PUBLICATIONS

Extended European Search Report, dated Oct. 24, 2017, in connection with Application No. 15810048.7.
(Continued)

*Primary Examiner* — Robert Canfield
(74) *Attorney, Agent, or Firm* — Meunier Carlin & Curfman LLC

(57) ABSTRACT

A pipe rack and a method for making a pipe rack where the pipe rack may include at least one foundation, two legs, and a horizontal support. The two legs are supported by the at least one foundation. Each of the two legs includes at least one aperture. The horizontal support has two ends. The first end is located in an aperture in a first leg of the two legs and a second end of the horizontal support is located in an aperture in a second leg of the two legs. A rod forms a joint between the foundation and one of the two legs. The rod is located in the aperture in the upper surface of the foundation and in an aperture in a lower surface in the one of the two legs.

11 Claims, 28 Drawing Sheets

Related U.S. Application Data continuation-in-part of application No. 14/689,589, filed on Apr. 17, 2015, now Pat. No. 9,420,885, and a continuation of application No. 14/306,326, filed on Jun. 17, 2014, now Pat. No. 9,032,677.

(51) Int. Cl.
| | |
|---|---|
| *E04H 17/22* | (2006.01) |
| *E21B 19/14* | (2006.01) |
| *E02D 27/02* | (2006.01) |
| *E02D 27/46* | (2006.01) |
| *F16L 3/223* | (2006.01) |
| *E04H 17/14* | (2006.01) |

(52) U.S. Cl.
CPC ............ *E04H 17/22* (2013.01); *E21B 19/14* (2013.01); *F16L 3/2235* (2013.01); *E04H 2017/1465* (2013.01)

(58) Field of Classification Search
CPC ..... E04G 13/023; E04G 13/02; E04G 17/002; E04G 17/14; E04H 12/22; E04H 12/2238; E04H 12/2253; E04H 12/2276; E04H 12/2246; E04H 12/2261; E04H 12/2269; E04H 12/2292; E04H 17/22; E04H 17/1421; E04H 17/1443; E04H 2017/1465; E04F 11/1812; E04F 11/1817; E04F 2011/1819; E04F 2011/1827; E01D 18/00; E04B 1/21; E04B 1/215; E04B 1/41; E04B 1/4114; E04B 1/4121; E04B 1/4157; E04B 1/4164; E04B 1/48; E04B 1/483; E04B 1/486; E04B 2001/2445; E04B 2001/2463; E04B 2001/268; E04B 2001/2684; E01F 15/0461; E01F 15/083; E01F 15/0446; Y10T 403/4637
USPC ........ 52/294, 296, 299; 256/65.14, 19, 13.1; 403/243

See application file for complete search history.

(56) References Cited

U.S. PATENT DOCUMENTS

| | | | |
|---|---|---|---|
| 983,367 A | 2/1911 | Holmberg | |
| 1,149,613 A | 8/1915 | Auer | |
| 1,293,138 A | 2/1919 | McArthur | |
| 1,429,084 A * | 9/1922 | Loeffler | E04H 17/20 256/19 |
| 1,633,659 A * | 6/1927 | Cerny | E01F 15/0461 256/13.1 |
| 2,413,990 A | 1/1947 | Muntz | |
| 2,574,711 A | 11/1951 | Rose | |
| 2,662,739 A | 12/1953 | Fisher | |
| 2,718,362 A | 9/1955 | Piperoux | |
| 2,783,029 A | 2/1957 | Fisher et al. | |
| 2,800,305 A | 7/1957 | Gerstner | |
| 2,955,806 A | 10/1960 | Block | |
| 3,067,985 A | 12/1962 | Cusack | |
| 3,074,209 A | 1/1963 | Henderson | |
| 3,221,458 A | 12/1965 | Lucas | |
| 3,261,135 A | 7/1966 | Knabe | |
| 3,420,013 A * | 1/1969 | Alvarado | E04F 11/1812 52/1 |
| 3,436,892 A | 4/1969 | Slavin | |
| 3,845,594 A * | 11/1974 | Butts | E04B 5/29 52/334 |
| 3,867,805 A | 2/1975 | Mikami | |
| 3,945,168 A * | 3/1976 | Butts | E04B 5/29 248/351 |
| 4,177,968 A * | 12/1979 | Chapman | E04C 3/07 249/211 |
| 4,229,919 A * | 10/1980 | Hughes | A47C 11/00 264/31 |
| 4,289,302 A * | 9/1981 | Montgomery | E04H 17/1413 256/19 |
| 4,386,762 A | 6/1983 | Collins | |
| 4,550,536 A | 11/1985 | Lamoure | |
| 4,602,765 A | 7/1986 | Loper | |
| 4,660,331 A | 4/1987 | Dahlen et al. | |
| 4,702,459 A | 10/1987 | Moschner | |
| 4,889,322 A * | 12/1989 | Wagner | E04H 17/08 256/36 |
| 4,892,292 A | 1/1990 | Russell | |
| 4,951,438 A | 8/1990 | Thoresen | |
| 5,312,089 A | 5/1994 | Venegas, Jr. | |
| 5,404,682 A * | 4/1995 | West | A47G 29/1216 248/183.1 |
| 5,613,664 A | 3/1997 | Svalbe | |
| 5,689,927 A * | 11/1997 | Knight, Sr. | E01F 8/0023 181/210 |
| 5,749,481 A * | 5/1998 | Miller | A47B 96/1441 211/187 |
| 5,795,503 A | 8/1998 | Krake | |
| 5,851,446 A | 12/1998 | Brando et al. | |
| 5,902,522 A | 5/1999 | Seawell et al. | |
| 5,975,500 A | 11/1999 | Orton et al. | |
| 5,987,830 A | 11/1999 | Worley | |
| 6,299,142 B1 | 10/2001 | Chaney | |
| 6,299,143 B1 | 10/2001 | Valentine | |
| 6,327,825 B1 | 12/2001 | Sanders | |
| 6,851,660 B1 | 2/2005 | Cravatt | |
| 6,886,296 B1 * | 5/2005 | John | E02D 5/60 248/519 |
| 7,080,827 B1 | 7/2006 | Mccannon, Jr. | |
| 7,267,324 B2 | 9/2007 | Young | |
| 8,444,343 B2 | 5/2013 | McCue | |
| 9,206,581 B2 * | 12/2015 | Mollick | E02D 27/32 |
| 2004/0256609 A1 | 12/2004 | Mills | |
| 2006/0142402 A1 * | 6/2006 | Dunnrowicz | E04H 12/2261 521/56 |
| 2006/0156675 A1 * | 7/2006 | Nelson | E04G 11/062 52/633 |
| 2006/0254162 A1 | 11/2006 | Workman | |
| 2006/0255327 A1 | 11/2006 | Johnston | |
| 2006/0266726 A1 * | 11/2006 | Swanson | A47B 47/021 211/186 |
| 2007/0209314 A1 * | 9/2007 | Vaughn | E02D 27/34 52/838 |
| 2009/0249660 A1 * | 10/2009 | Brenize | E02D 27/02 37/407 |
| 2011/0283657 A1 | 11/2011 | Barrett et al. | |
| 2013/0015151 A1 * | 1/2013 | Wolfbauer | A01K 97/08 211/70.8 |
| 2013/0175427 A1 * | 7/2013 | Moyher | E02D 19/00 249/18 |
| 2014/0033628 A1 | 2/2014 | Lockwood | |
| 2014/0183330 A1 * | 7/2014 | Simmons | G01B 3/30 249/49 |
| 2015/0204106 A1 * | 7/2015 | Hedley | E04H 17/22 256/32 |
| 2016/0017555 A1 * | 1/2016 | Kemper | E01F 15/0461 404/6 |

FOREIGN PATENT DOCUMENTS

| | | | |
|---|---|---|---|
| JP | 07292770 A | * | 11/1995 |
| JP | H11181796 | | 7/1999 |
| WO | 2009157601 A1 | | 12/2009 |

OTHER PUBLICATIONS

International Search Report and Written Opinion issued in International Application No. PCT/US2015/035913 dated Sep. 1, 2015.
Non-Final Office Action issued in U.S. Appl. No. 14/306,326 dated Feb. 4, 2015.
Non-Final Office Action issued in U.S. Appl. No. 14/470,306 dated Nov. 25, 2015.

(56) References Cited

OTHER PUBLICATIONS

Non-Final Office Action issued in U.S. Appl. No. 14/689,589 dated Nov. 23, 2015.
Notice of Allowance issued in U.S. Appl. No. 14/689,589 filed Apr. 25, 2016.
Notice of Allowance issued in U.S. Appl. No. 14/740,306 dated Apr. 21, 2016.
Final Office Action issued in U.S. Appl. No. 15/243,940 dated May 19, 2017.
Non-Final Office Action issued in U.S. Appl. No. 15/243,940 dated Oct. 4, 2016.
Non-Final Office Action, dated Jul. 25, 2018, in connection with U.S. Appl. No. 15/243,940.
Vaquero, Sebastian F., et al., Precast concrete, steel-braced, hybrid pipe rack structures, PCI Journal vol. 58(4), pp. 55-67, Sep. 1, 2013.
Extended European Search Report issued in EP Application 18198978.1, dated Feb. 14, 2019.

* cited by examiner

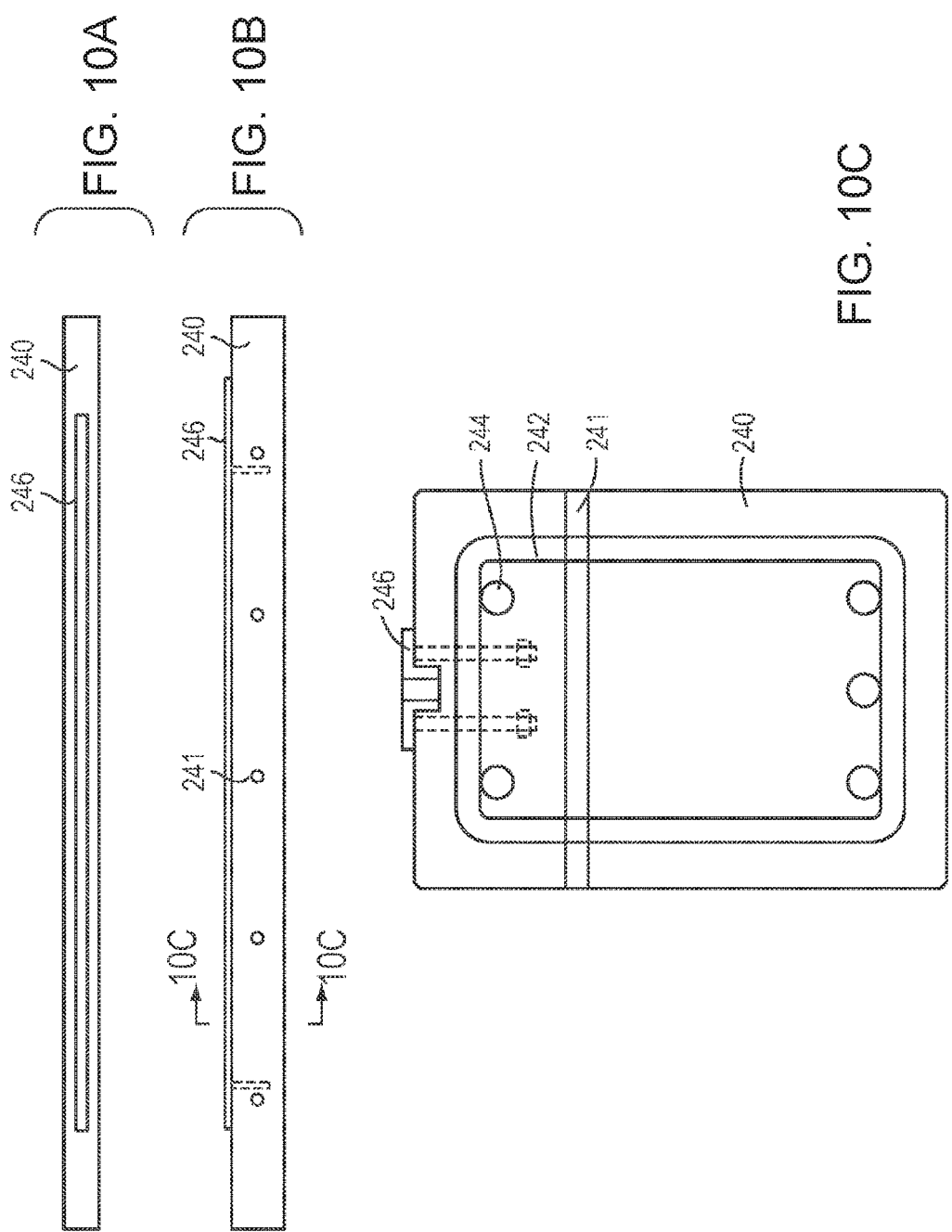

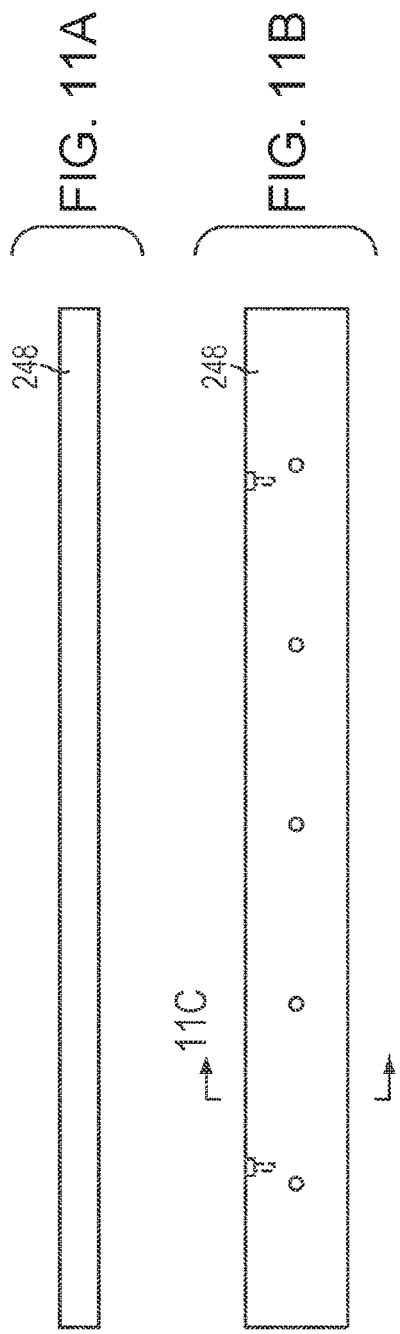
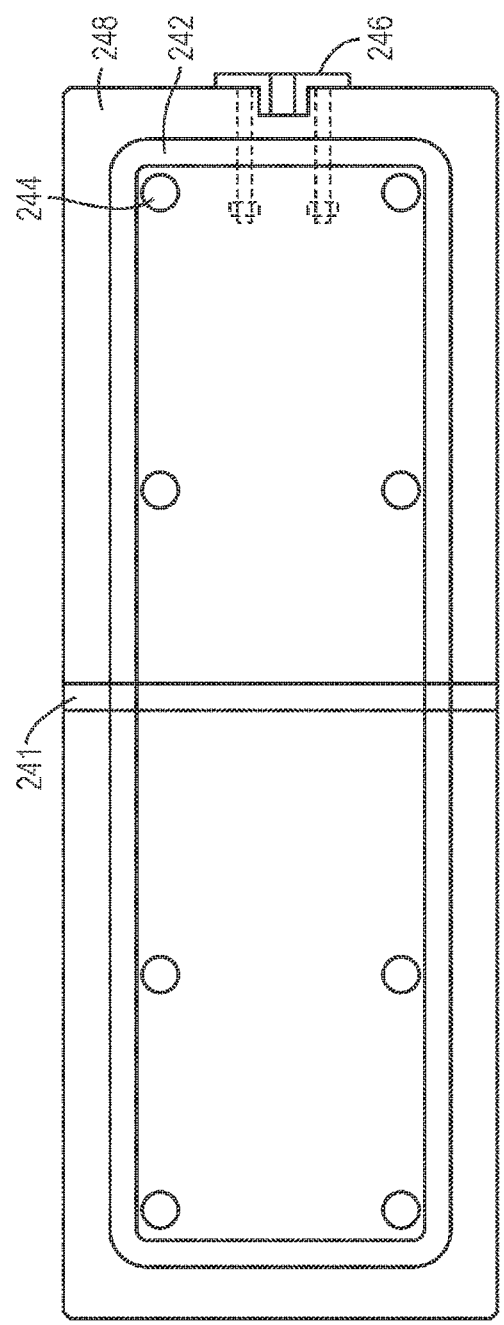

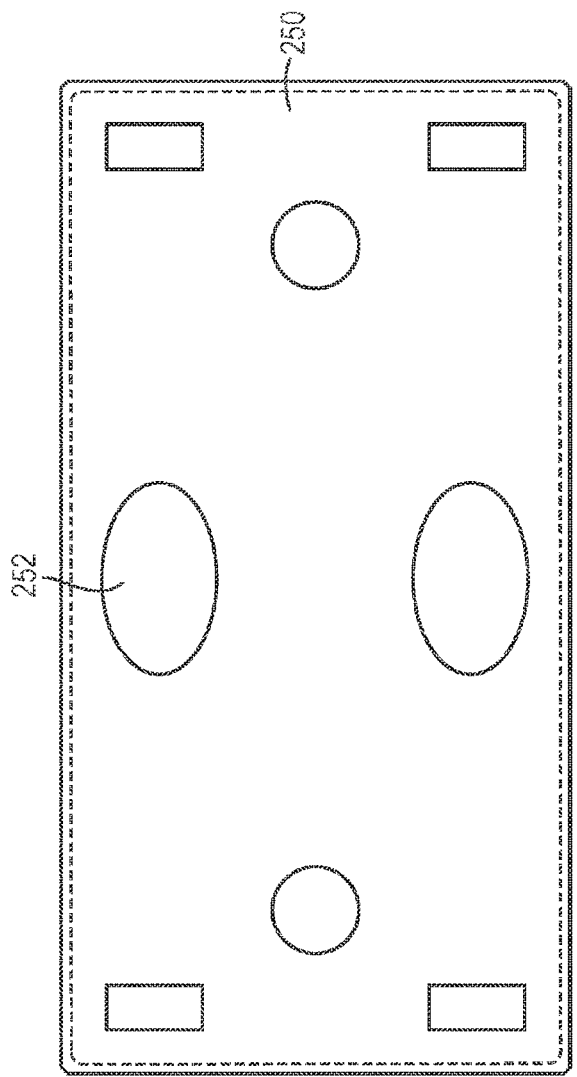

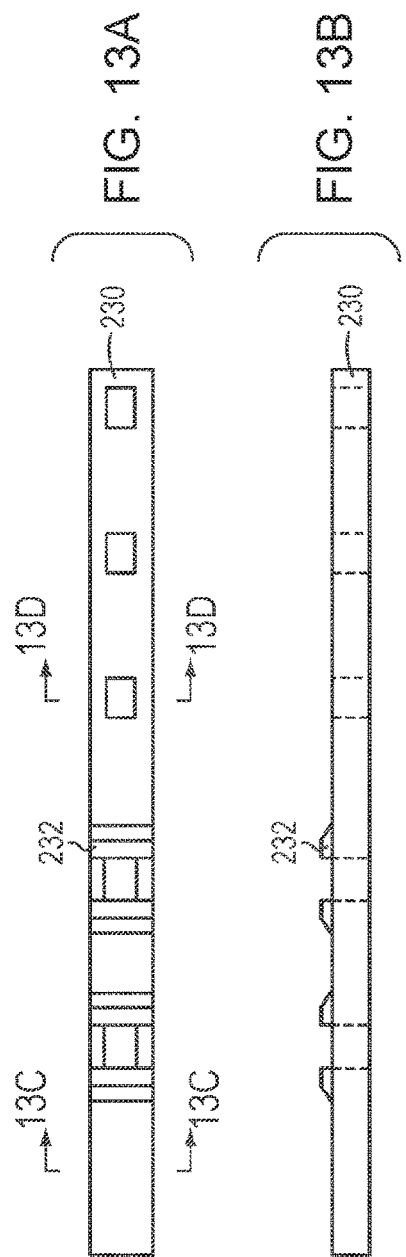
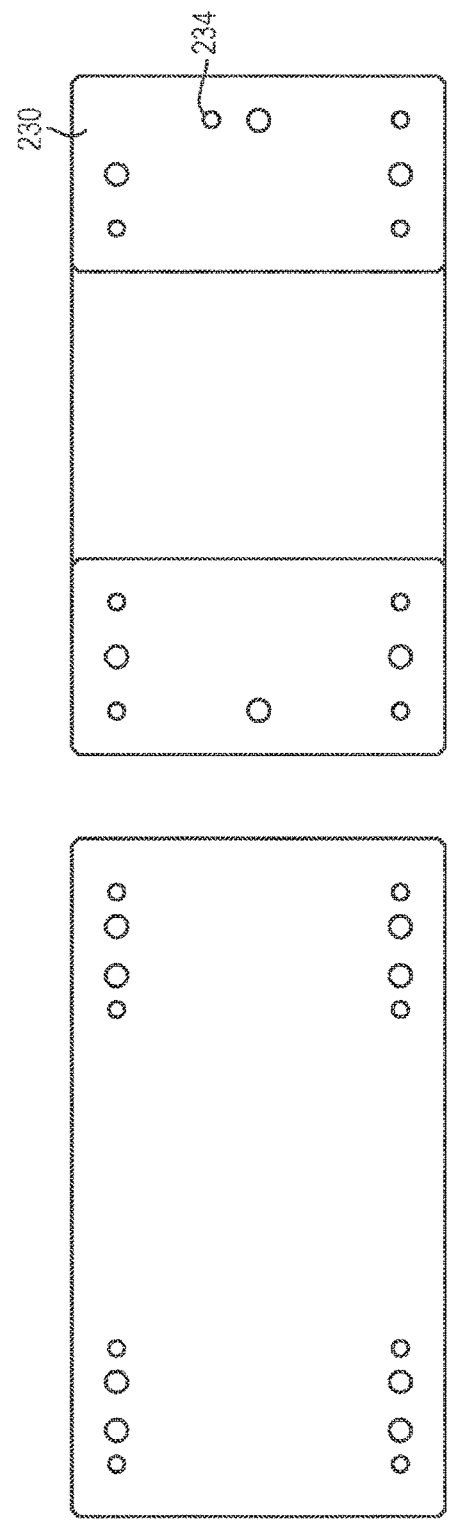
FIG. 13A
FIG. 13B
FIG. 13C
FIG. 13D

PIPE RACKS

CROSS REFERENCE TO RELATED APPLICATIONS

This application claims priority to and is a continuation of U.S. patent application Ser. No. 14/740,306, filed Jun. 16, 2015, which is a continuation in part of U.S. patent application Ser. No. 14/689,589, filed Apr. 17, 2015, which issued as a U.S. Pat. No. 9,420,885 on Aug. 23, 2016, which is a continuation of U.S. patent application Ser. No. 14/306,326, filed Jun. 17, 2014, which issued as U.S. Pat. No. 9,032,677 on May 19, 2015. Each of these applications is incorporated by reference herein in its entirety.

FIELD OF THE INVENTION

The present subject matter relates generally to racks for supporting pipes, especially pipes at a refinery.

BACKGROUND OF THE INVENTION

Oil refineries include many chemical processing units, each removing one or more hydrocarbons from a mixture of many. Extensive piping runs between all of these processing units and various holding tanks. This piping is generally supported off the ground by steel racks. Each section of rack including two legs and at least one horizontal support bar is generally called a bent.

A first problem that arises with the present pipe racks is that if one of the pipes leaks liquid or gas that catches fire, an intense fire can cause the steel bent to lose its structural integrity. This will then cause the rest of the pipes on that bent to lose support, possibly rupturing the other pipes as well. This can cause a single leak to turn into a catastrophic fire and/or explosion. Thus, racks impervious to fire would avoid this problem.

Further, the location and orientation of each bent is very important to ensure the correct support of the pipe, including the correct slope to the pipe (if any). Steel bents require that the foundation of each leg be determined very accurately to ensure accurate placement of the bent. This is very time consuming, leading to greater cost and delay when building the refinery. Accordingly, a pipe rack that can be placed without such additional labor is desired.

SUMMARY OF THE INVENTION

The present invention broadly comprises a pipe rack and a method for making a pipe rack. In one embodiment, the pipe rack may include at least one foundation, two legs, and a horizontal support. The two legs are supported by the at least one foundation. Each of the two legs includes at least one aperture. The horizontal support has two ends. The first end is located in an aperture in a first leg of the two legs and a second end of the horizontal support is located in an aperture in a second leg of the two legs. A rod forms a joint between the foundation and one of the two legs. The rod is located in the aperture in the upper surface of the foundation and in an aperture in a lower surface in the one of the two legs.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 10A-C are views of a second embodiment of the horizontal support;

FIGS. 11A-C are views of a third embodiment of the horizontal support;

FIGS. 12A and 12B are views of a second embodiment of the struts;

FIGS. 13A-C are views of a second embodiment of the vertical support;

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
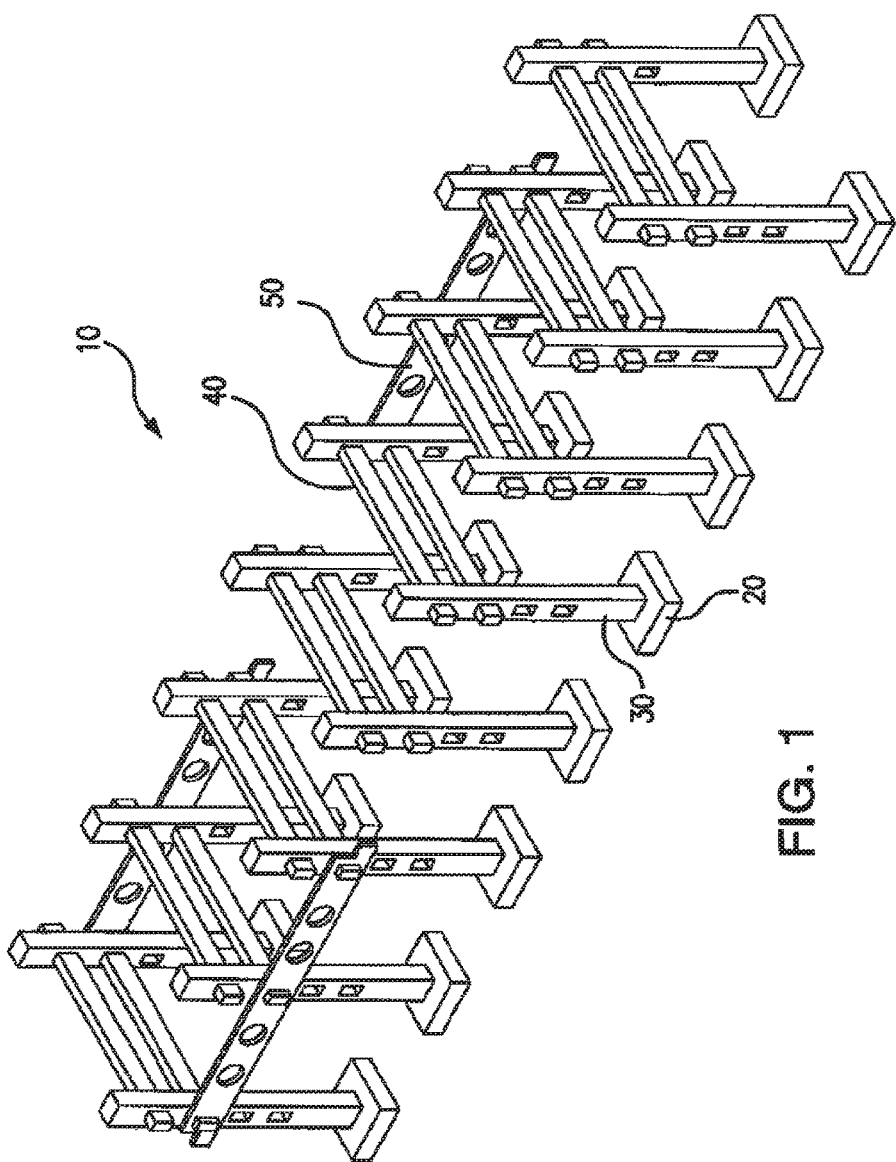
FIG. 1 illustrates a perspective view of a first embodiment of the present invention.

FIG. 1 shows a perspective view of a first embodiment of an apparatus 10 for supporting pipes in accordance with the present invention. Apparatus 10 may also support other equipment such as power lines, or other objects. Further, as described herein, apparatus 10 is made of pre-stressed concrete so as to be impervious to fire. However, pipe racks as described herein made of other materials such as other fire impervious materials are also within the scope of the present invention.

Figure 3:
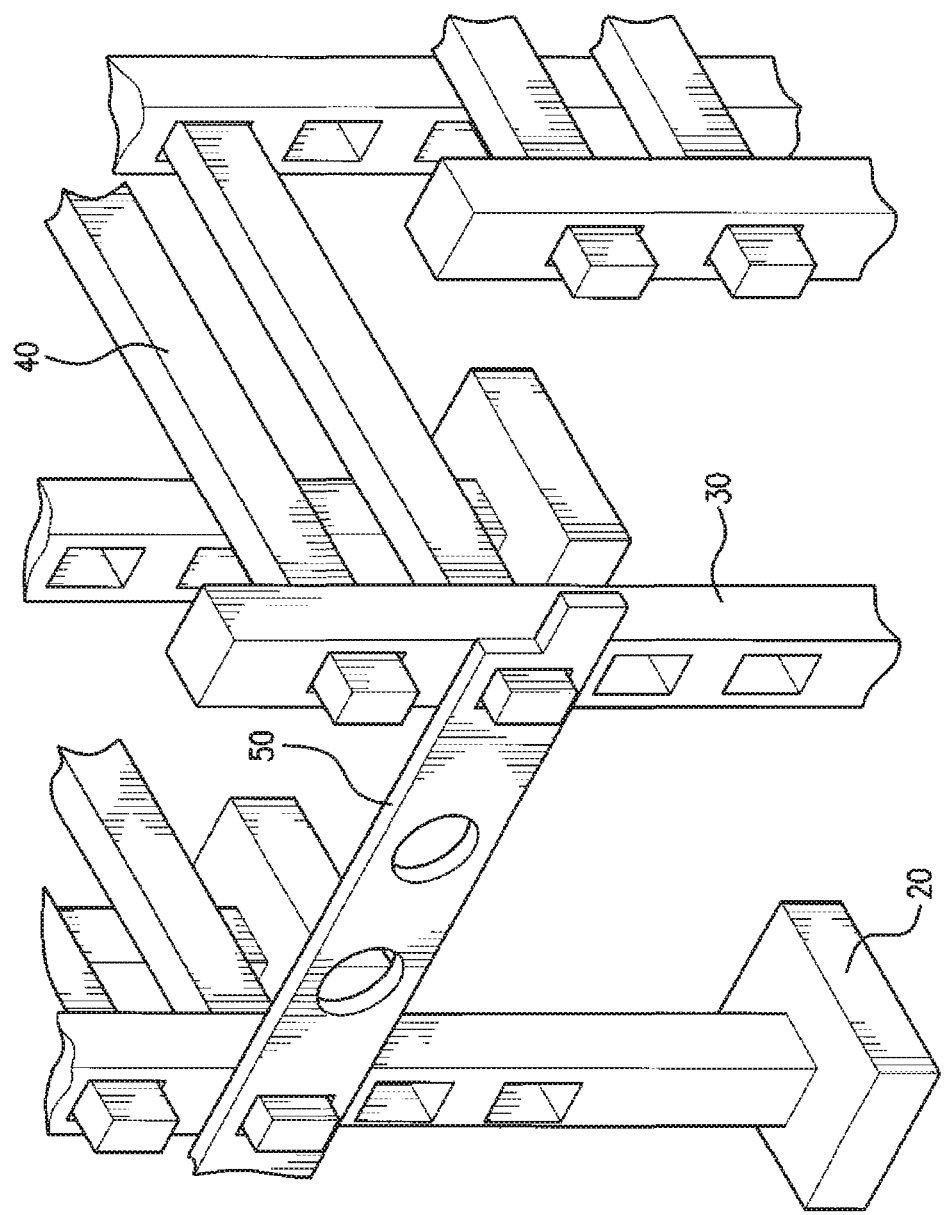
FIG. 3 illustrates a close up perspective view of a horizontal strut.

Apparatus 10 includes foundations 20, legs 30 located on foundations 20, horizontal supports 40, and horizontal struts 50 (shown in close up in FIG. 3). In the embodiment shown in FIG. 1, foundations 20 may be placed approximately 20 feet apart in the direction of the pipe, and approximately 25 feet apart in the direction perpendicular to the direction of the pipe. However, different or irregular distances are also within the scope of the invention.

FIG. 1 also shows that legs 30 have four apertures 32 for receiving horizontal supports 40, two of which include horizontal supports 40. Any number of apertures 32 or horizontal supports 40 are within the scope of the invention. Further, any number or length of horizontal struts 50 are also within the scope of the invention.

Figure 2:
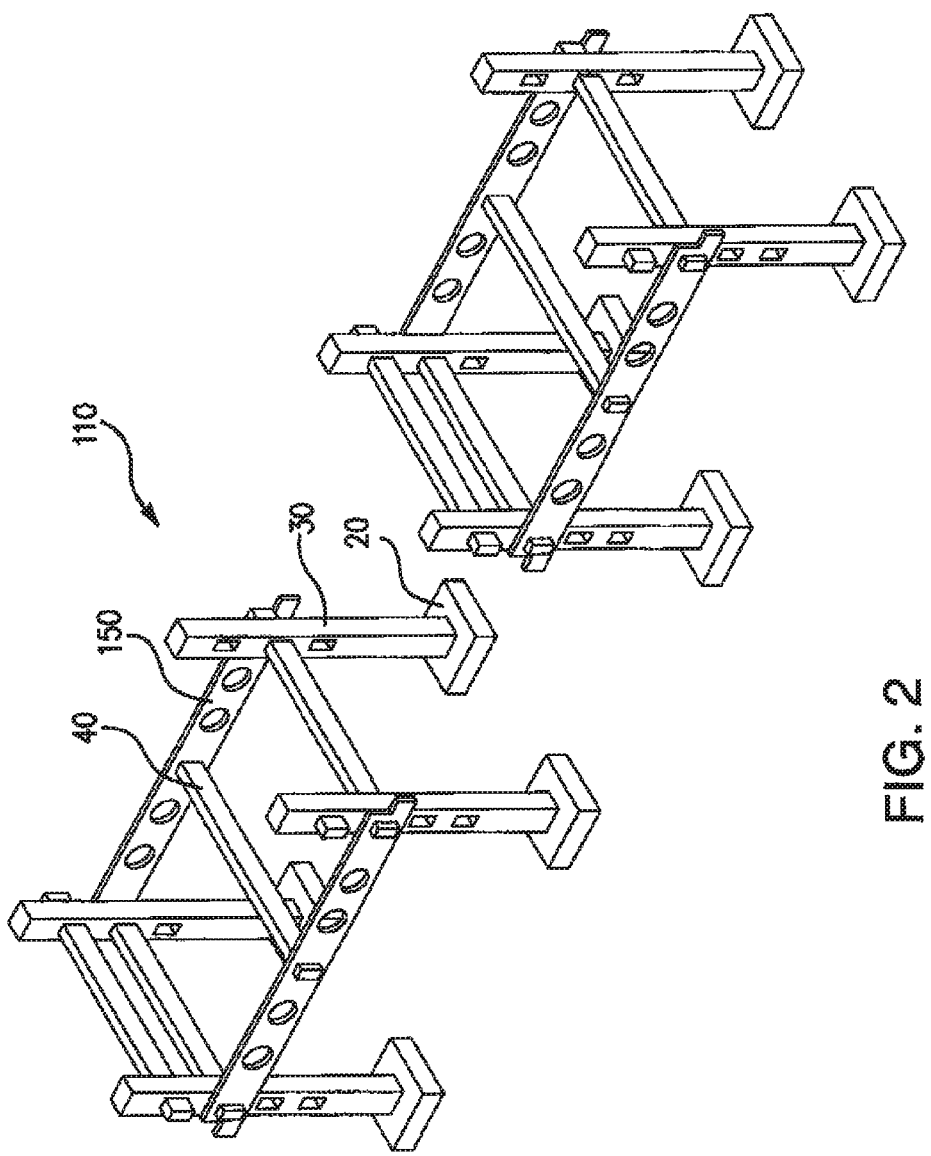
FIG. 2 is a perspective view of a second embodiment of the present invention.

FIG. 2 shows a second embodiment of the present invention, apparatus 110. Apparatus 110 includes foundations 20 placed at double the spacing shown in FIG. 1. Apparatus 110 also includes legs 30, horizontal supports 40, and horizontal struts 150. However, horizontal support 40 may also be supported by horizontal struts 150 at locations equidistant between foundations 20. Thus, the same spacing of horizontal supports 30 is maintained, while the number of foundations 20 is halved. This can dramatically increase construction speed, as laying the foundations can be very labor intensive.

Figure 5:
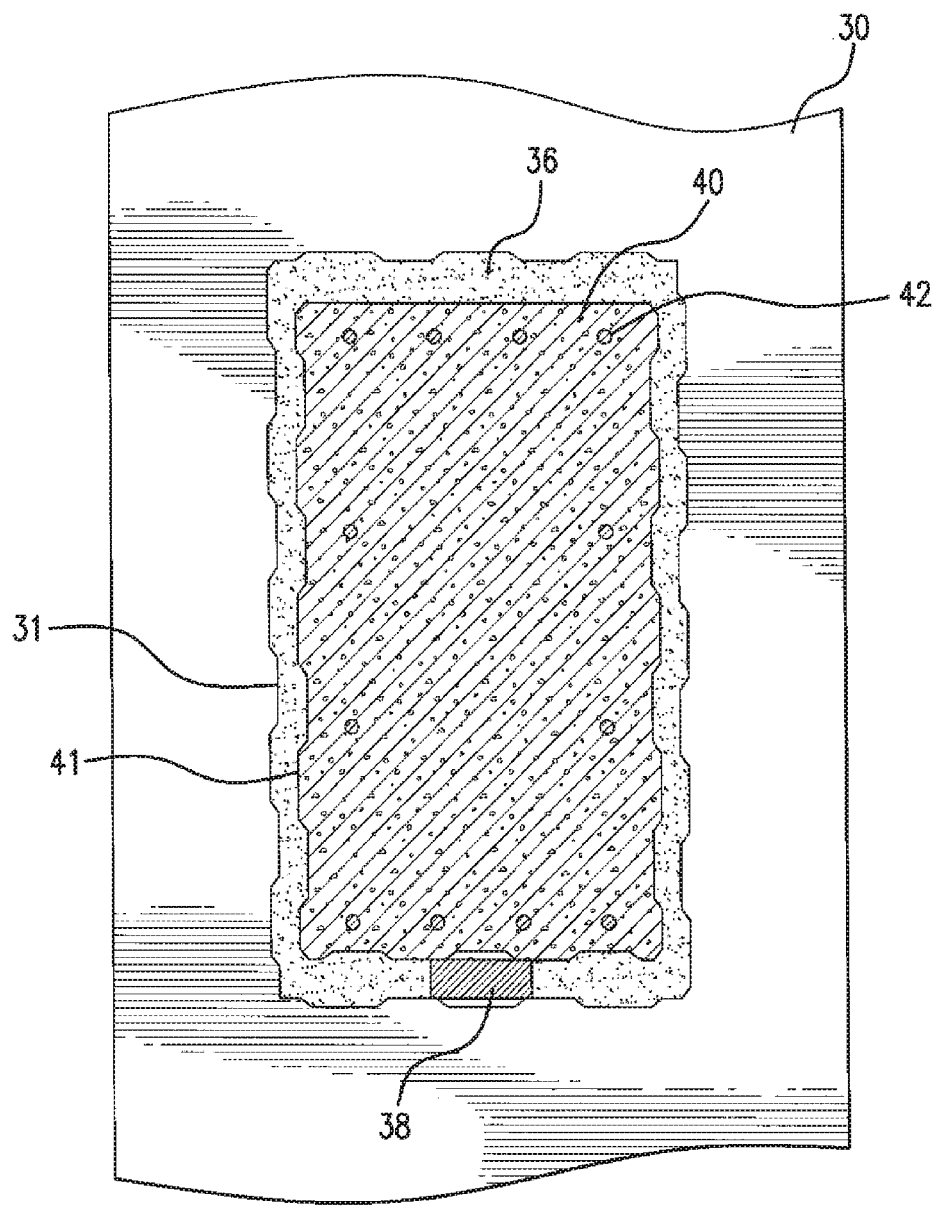
FIG. 5 is a side view of a first embodiment of the joint between the leg and the horizontal support.
Figure 7:
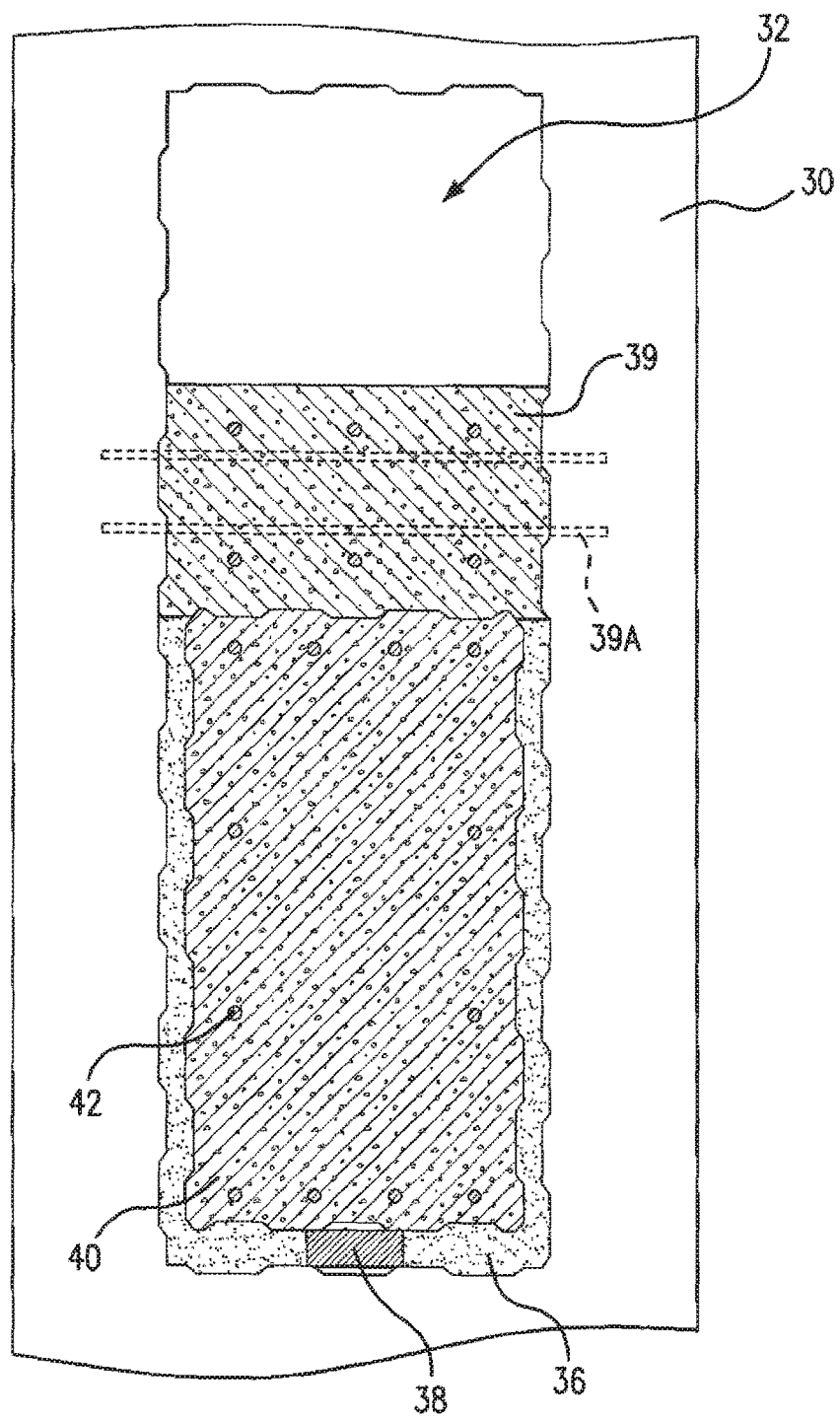
FIG. 7 is a side view of a second embodiment of the joint between the leg and the horizontal support.

Horizontal supports 40 may be joined to horizontal struts 150 and legs 30 by either of the joining methods shown in FIGS. 5 and 7.

Figure 4:
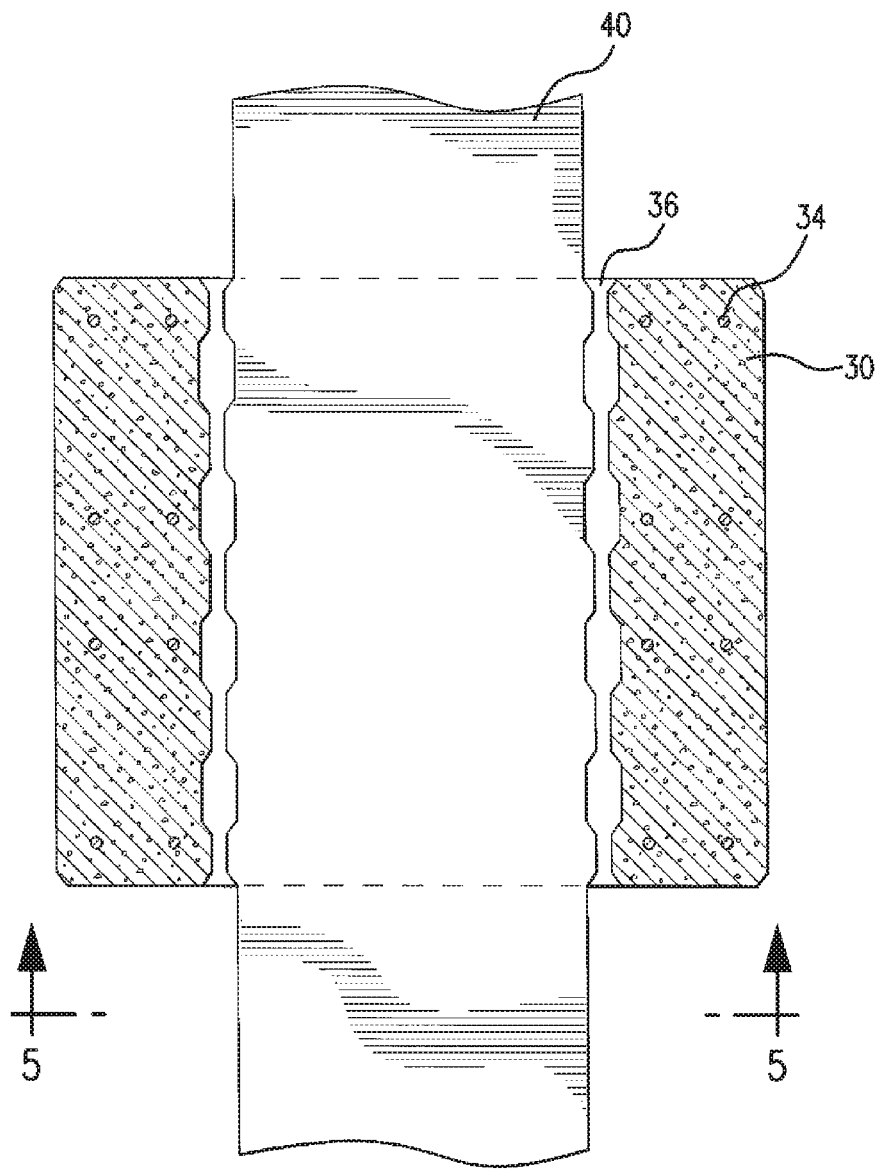
FIG. 4 is a top cutaway view of the joint between the leg and the horizontal support.

FIG. 4 shows a cut away top view of the joint between leg 30 and horizontal support 40. Leg 30 may have pre-stress strands 34 extending in the vertical direction. Both the inside of aperture 32 and the outside of the portion of horizontal support 40 that is received in aperture 32 may include shear key surfaces 31 and 41 to strengthen the adhesive bond between leg 30 and horizontal support 40. The volume between leg 30 and horizontal support 40 is filled with an adhesive 36, which may be an ultra-high performance concrete or grout. In one embodiment, leg 30 is 36 inches wide and 30 inches long (in the direction of the horizontal support 40).

FIG. 5 shows a side view of a first embodiment of the joint between leg 30 and horizontal support 40. In this embodiment, horizontal support 40 is surrounded on all sides by adhesive 36. The only gap in adhesive 36 is due to steel shim 38. In one embodiment, horizontal support 40 is 18 by 32 inches, and steel shim 38 is 4 by 4 inches in area and 2 inches thick. Thus, the steel shim lifts the horizontal support 40 off of the bottom of aperture 32 before the adhesive 36 is added to the space between the leg 30 and the horizontal support 40. This allows for a roughly even thickness of adhesive 36 around the four sides of the horizontal support 40. Horizontal support 40 may also include pre-stress strands 42 extending in the horizontal direction.

Accordingly, aperture 32 is significantly bigger than horizontal support 40. For example, aperture 32 may be 22 by 36 inches and support 40 may be 18 by 32 inches. Thus, roughly 2 inches of space on each side can be found between the aperture 32 and horizontal support 40. This equates to lateral dimensions of support 40 being 81-89% as big as the corresponding lateral dimensions of aperture 32. Supports 40 having dimensions from 50%-90% of the corresponding dimension of aperture 32 are within the scope of the invention. Further, cross-sectional areas of the support 40 are from 40%-75% of the cross-sectional area of aperture 32.

This space allows for significant adjustment of the configuration of the support 40 when connecting the support 40 to legs 30. Therefore, the location of foundations 20 does not need to be exact, as errors can be corrected by adjusting the amount of space between the support 40 and the aperture 32. The two inch allowance on each side of the support 40 described above allows for correcting errors of up to approximately 1.75 inches in the placement of foundations 20. In contrast, foundations for steel bents must be placed within a tolerance of 0.5 inches or less. Moreover, the present inventors discovered that there is a 1:0.9 ratio of the distance allowance between the support 40 and the aperture 32 and the distance tolerance for the foundations 20.

In this regard, FIGS. 1 and 2 show foundations 20, legs 30, horizontal support, and apertures 32 that are rectangular prisms. However, any other shapes or cross-sectional shapes for the foundations 20, legs 30, horizontal supports 40, struts 50, and apertures 32 are within the scope of the invention.

Figure 6:
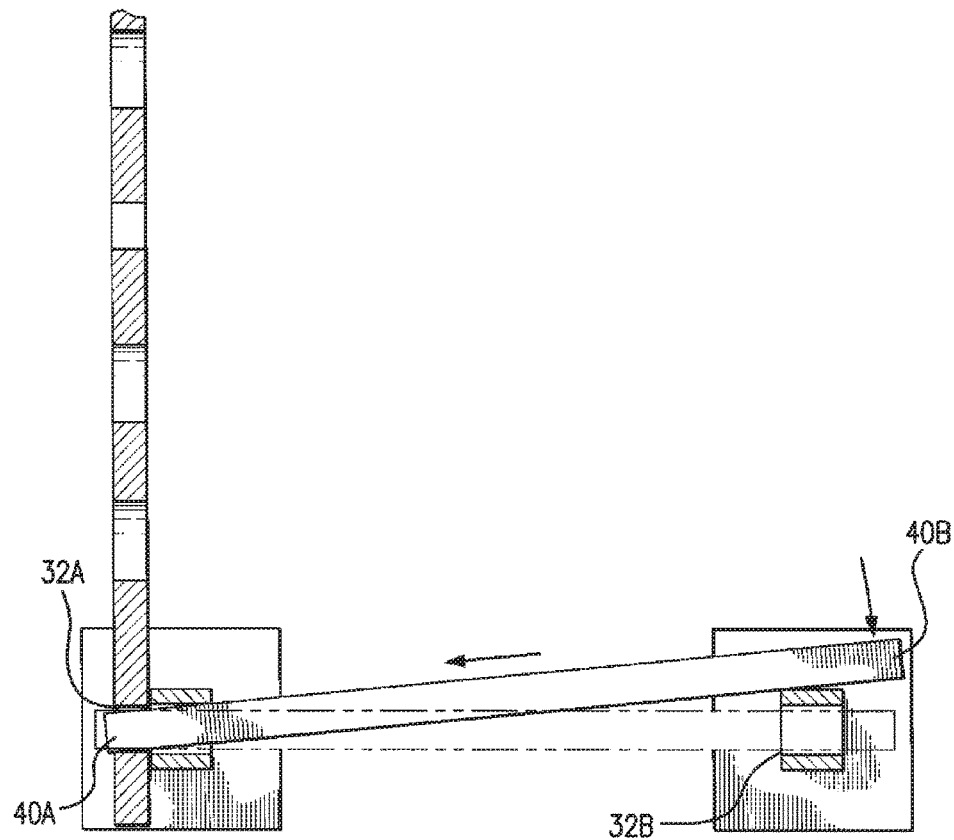
FIG. 6 is top view of the insertion process for inserting the horizontal support into the two legs.

FIG. 6 shows the process for constructing the present pipe racks. The foundations 20 are already placed and the legs 30 are inserted therein. The horizontal supports 40 are then inserted into the apertures 32 by inserting end 40A into aperture 32A, drawing the support 40 into the aperture 32A until the end 40B clears the opposite leg, and then moving the opposite end 40B into the aperture 32B of the opposite leg.

FIG. 7 shows a second embodiment of the joint between leg 30 and horizontal support 40. In this embodiment, aperture 32 is much longer in the height direction than support 40. Horizontal support 40 is then surrounded on only three sides by adhesive 36. (A steel shim may be used as shown in FIG. 5). Then an additional portion of concrete 39 is poured into the aperture 32 above the support 40. As shown in FIG. 7, reinforcement 39A can be placed in aperture 32 before pouring the additional concrete. The concrete portion 39 thus locks support 40 into place, while leaving the upper part of aperture 32 open. This additional space allows for even greater adjustment of the support 40 in the vertical direction. The vertical adjustment may be critical when the foundations 20 are being placed on ground that may be uneven.

Figure 8:
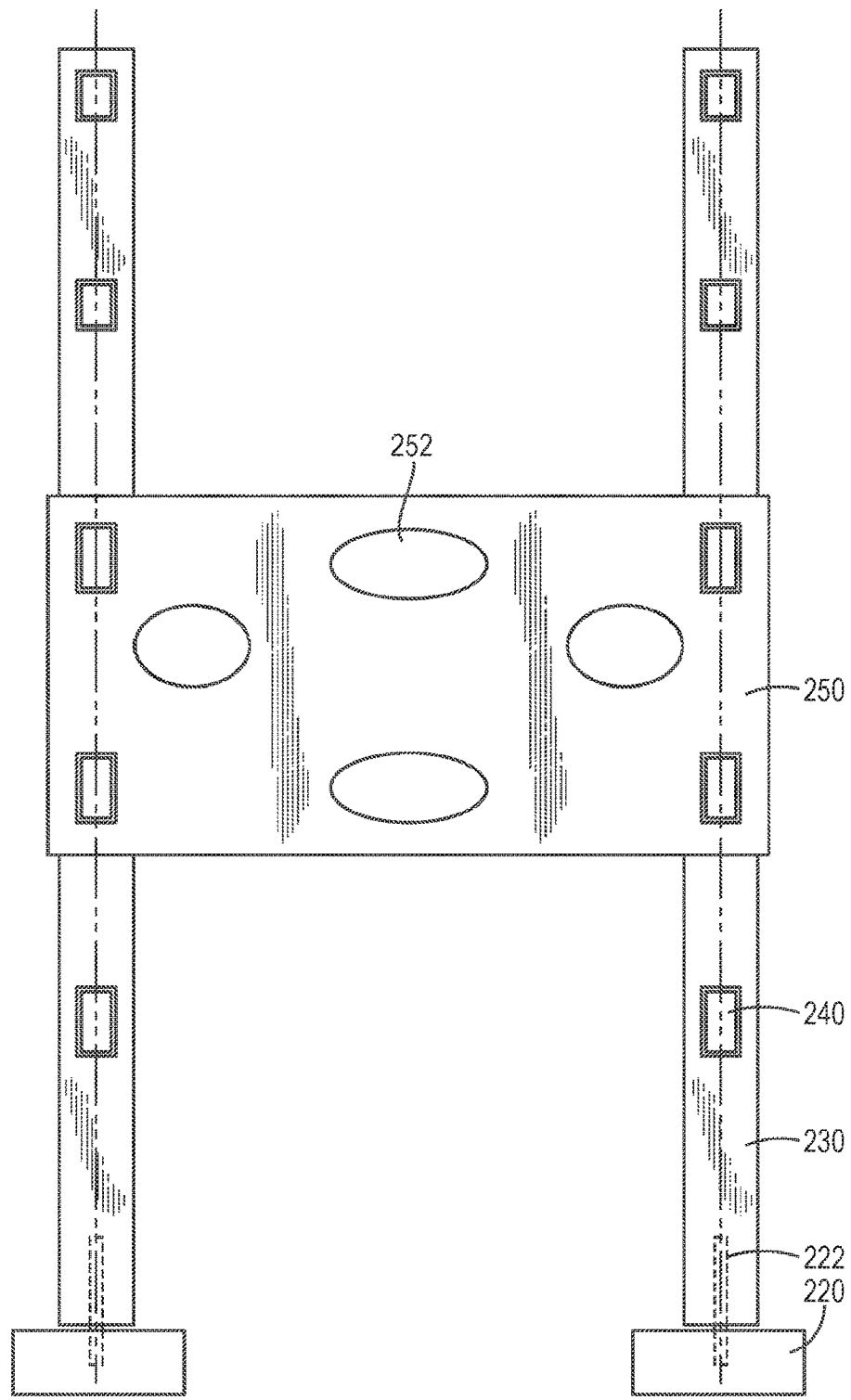
FIG. 8 is a side view of a second embodiment of the joint between the leg and the foundation.

FIG. 8 shows an alternative embodiment of the pipe racks of the present invention. In this embodiment, foundation 220 includes an aperture 221 in a top surface (shown in FIG. 17A). Connection bolt 222 is located in that aperture and extends into an aperture 231 (shown in FIG. 18) in a bottom surface of leg 230. Connection bolt 222 may be held in place with an adhesive such as grout. FIG. 8 also shows the end view of horizontal supports 240, and also shows the extended strut 250. Strut 250 extends between four horizontal supports 240, two on each of adjacent legs 230. Strut 250 also includes apertures 252. Apertures 252 can be sized and located to allow pipes splitting off from the main pipes on the rack to pass through. Apertures 252 may also lower the weight of strut 250 without significantly reducing the structural integrity of the pipe racks.

Figure 9:
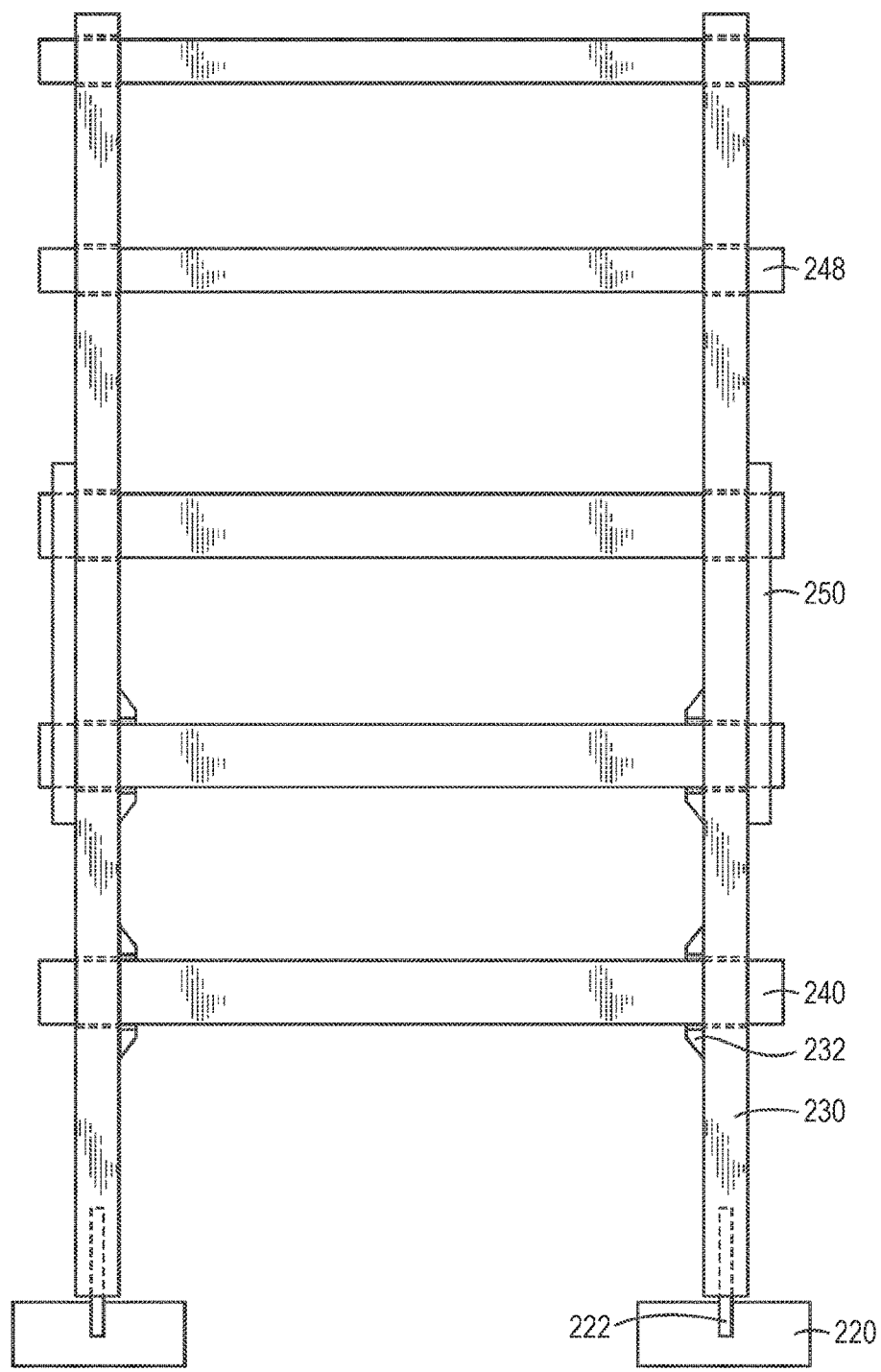
FIG. 9 is a front view of a second embodiment of the joint between the leg and the foundation.

FIG. 9 shows another view of the pipe racks shown in FIG. 8. Legs 230 may also include additional supports 232 to carry additional load from the horizontal supports 240. As shown in FIG. 9, the lower two of five horizontal supports receive additional support in this manner. However, any configuration of additional supports 232 is within the scope of the invention.

FIGS. 10A-10C show views of horizontal support 240. Horizontal support 240 includes a tube 241 that passes horizontally through the support. This allows the passage of, for example, wires through the support. The support also includes steel reinforcement rectangle 242 and steel rods 244 that may run the length of the support. Finally, a top surface of the support includes connector 246 which allows the pipes that run over the pipe rack to be secured to the horizontal support 240. For example, screws could be used to connect to connector 246 to secure brackets (not shown) over the pipes to the horizontal support 240.

FIGS. 11A-11C show an alternative embodiment of horizontal support 240, which is labeled 248 in FIG. 9. Alternative horizontal support 248 also includes a tube 241, but the tube is closer to a center of the support 248. Alternative horizontal support 248 includes steel reinforcement rectangle 242, steel rods 244, and connector 246 in a similar manner as support 240.

FIGS. 12A and 12B show views of strut 250. As noted previously, apertures 252 may be sized and located in any configuration within the scope of the invention.

FIGS. 13A-13C shows views of leg 230. As shown in FIG. 13C legs 230 include steel reinforcement rods 234.

Figure 14:
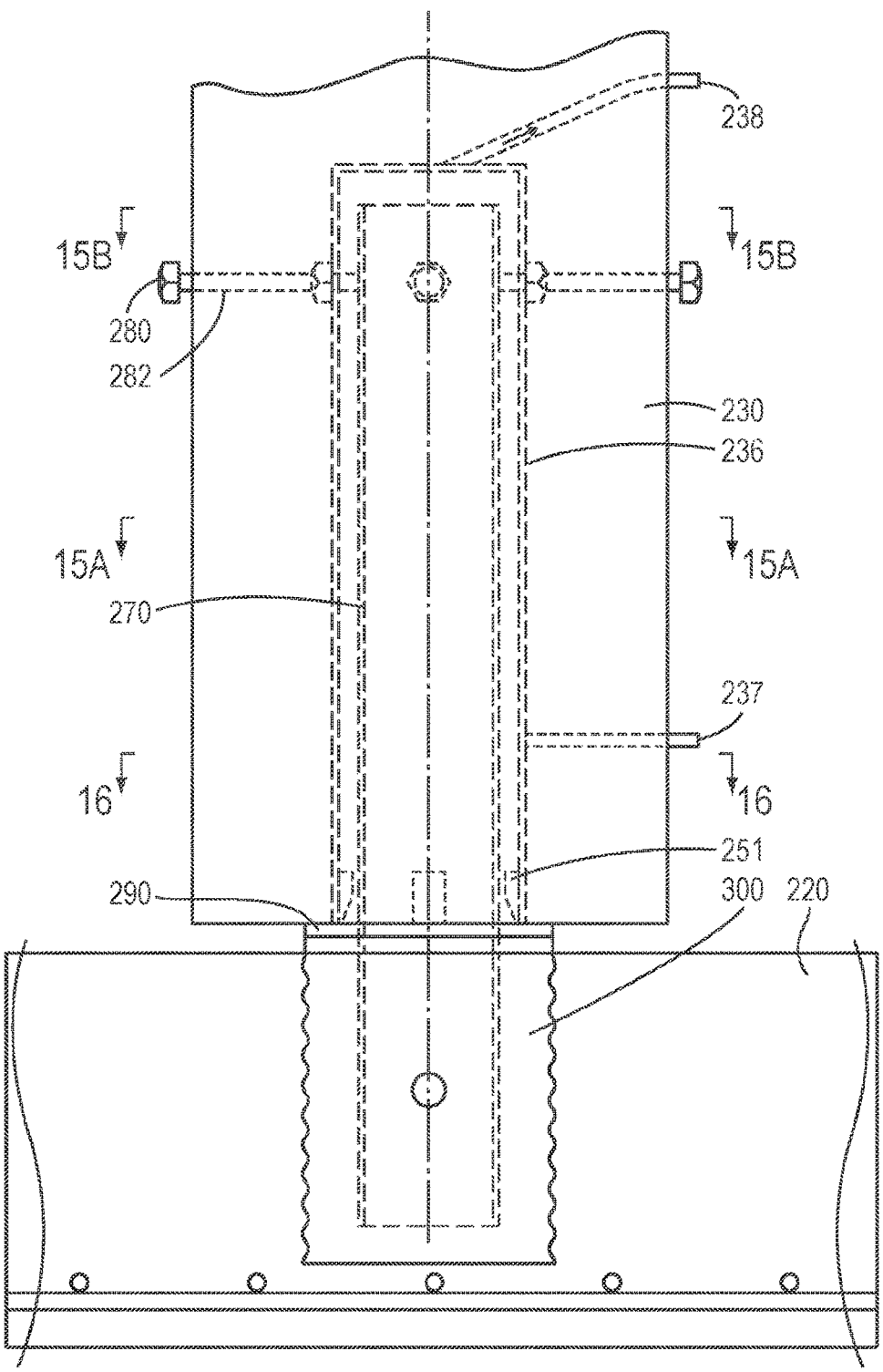
FIG. 14 is a front view of a third embodiment of the joint between the leg and the foundation.

FIG. 14 shows an alternative embodiment of the joint between the foundation and the leg. Foundation 220 includes an aperture 221 in a top surface that has connecting rod 270 located therein. The space around rod 270 is filled with grout 300. Grout bearing plate 290 is located over the grout 300. Rod 270 extends upward from foundation 220 into an aperture 231 in leg 230 that is bounded on the sides by rod 236. Rod 236 is cast within precast leg 230. The volume between rod 236 and rod 270 is also filled with grout. The grout enters the volume through grout inlet 237 and excess grout exits through grout exit 238. Leg 230 also includes passages 282 on each face of the leg. Bolts 280 pass through passages 282. Bolts 280 may be used to plumb the leg 230 by contacting rod 270 near the top of rod 270.

In one embodiment, rods 270 and 236 may be made of hollow structural steel. In one embodiment, rod 270 is 7 inches by 7 inches by ⅜ inch thick and rod 236 is 9 inches by 9 inches by 3/16 inch thick. However, different dimensions are within the scope of the invention.

Figure 15A:
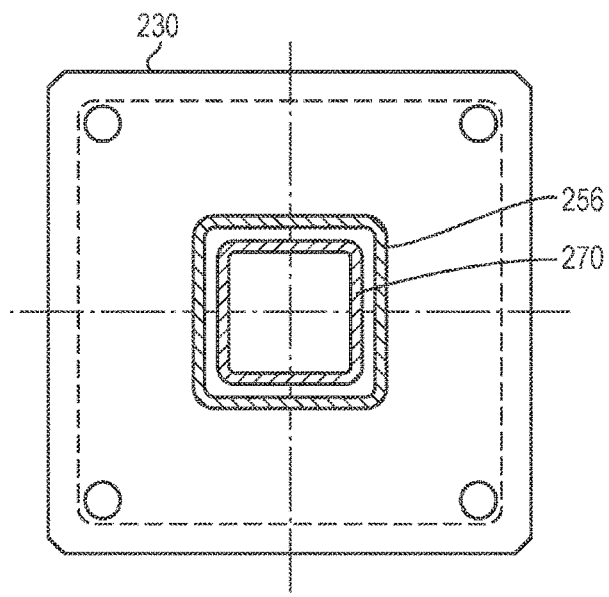
FIGS. 15A and 15B are cross sectional views of the third embodiment of the joint between the leg and the foundation.
Figure 15B:
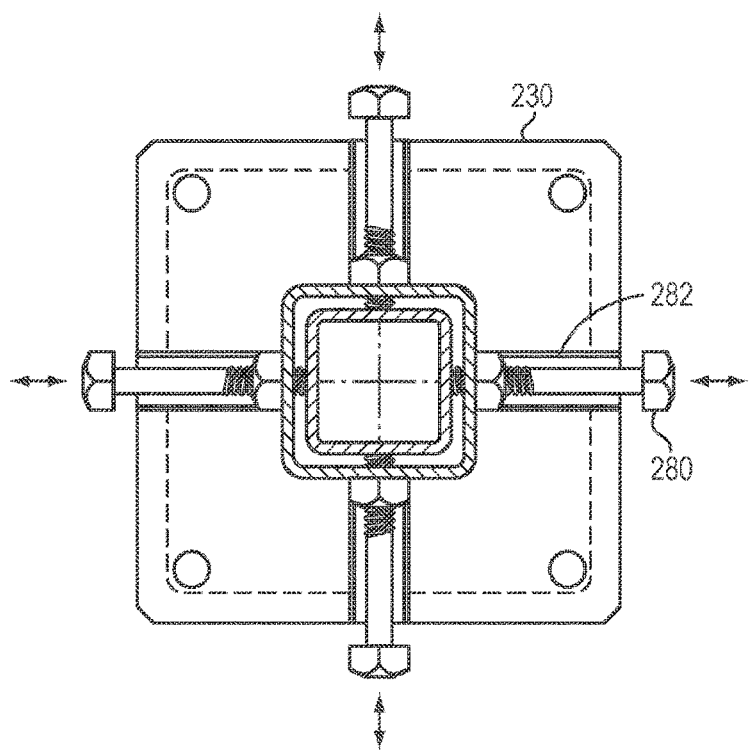
Figure 16:
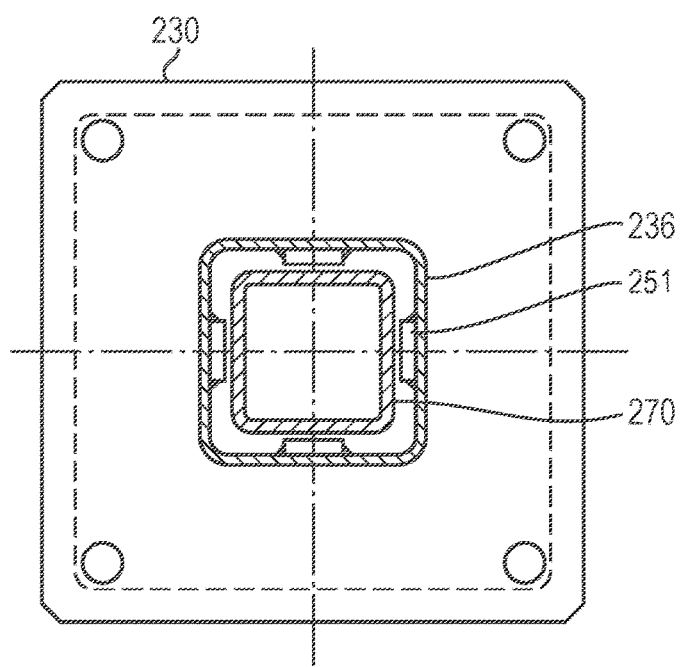
FIG. 16 is a cross sectional view of the third embodiment of the joint between the leg and the foundation.

FIGS. 15A, 15B, and 16 are cross sectional views taken of the structure shown in FIG. 14. FIG. 16 also shows lugs 251 welded to rod 236 near the lower end of rod 236.

Figure 17A:
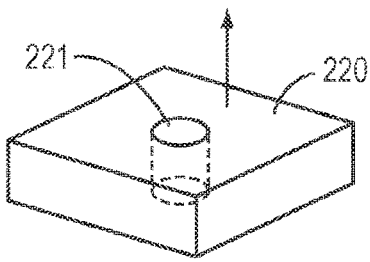
FIGS. 17A-C are views of a first embodiment of a method for making the joint between the leg and the foundation.
Figure 17B:
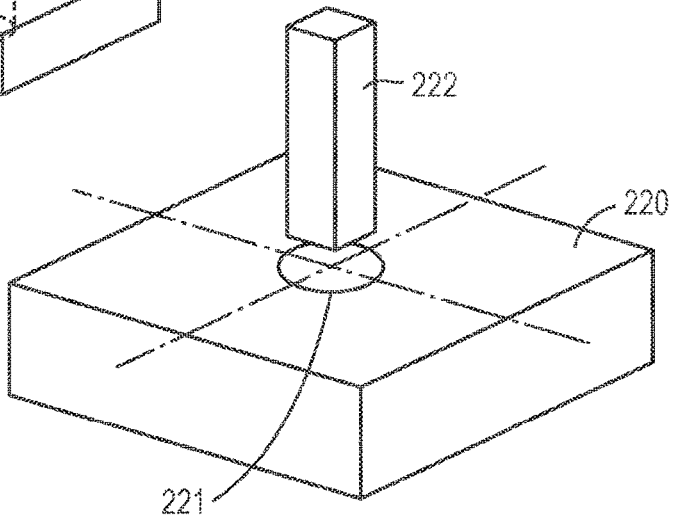
Figure 17C:
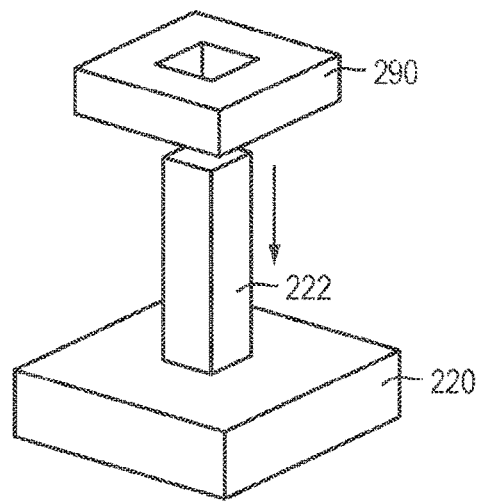

FIGS. 17A-17C show one embodiment of a method of constructing the joint between foundation 220 and leg 230. Step 1 is shown in FIG. 17A where foundation 220 including circular aperture 221 is placed. Rectangular rod 222 is then inserted in aperture 221 and an adhesive such as grout is placed in aperture 221 after rod 222 is plumb, as shown in FIG. 17B. Grout plate 290 is then placed over the grout joint in FIG. 17C, and the foundation is ready to receive the leg 230.

Figure 18:
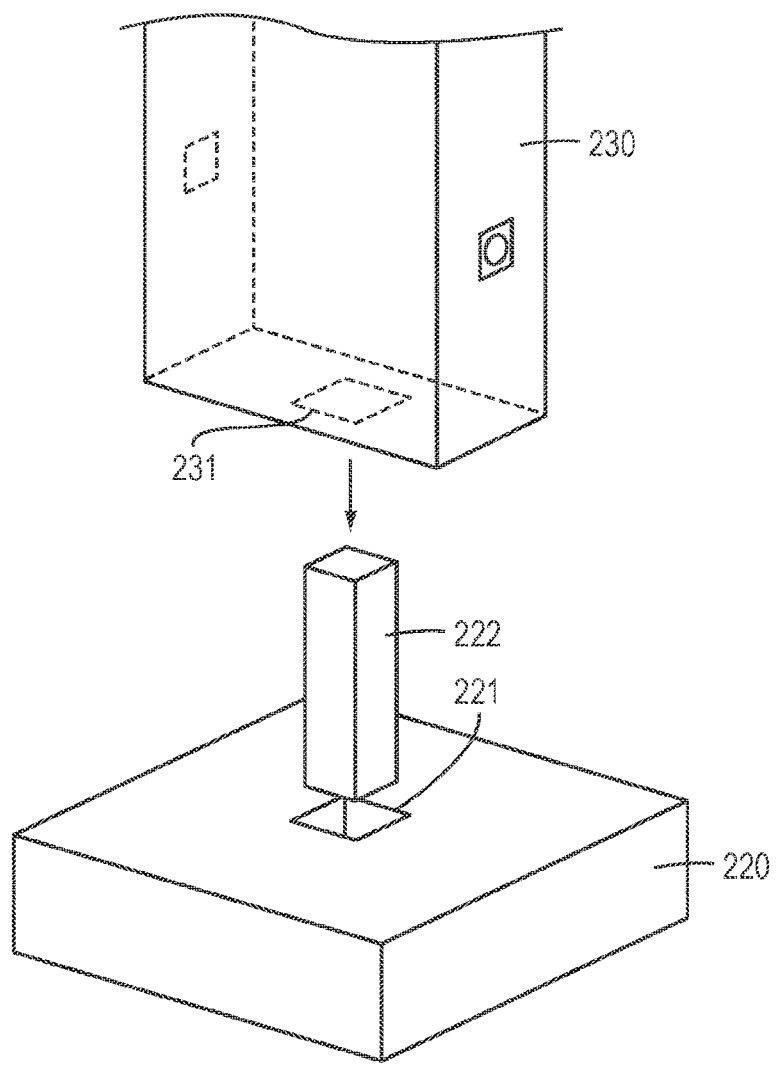
FIG. 18 is a view of a second embodiment of a method for making the joint between the leg and the foundation.

FIG. 18 shows another embodiment of a method to create the joint between the foundation and the leg. Foundation 220 including square aperture 221 receives rod 222, which is then placed in aperture 231 of leg 230.

Figure 19:
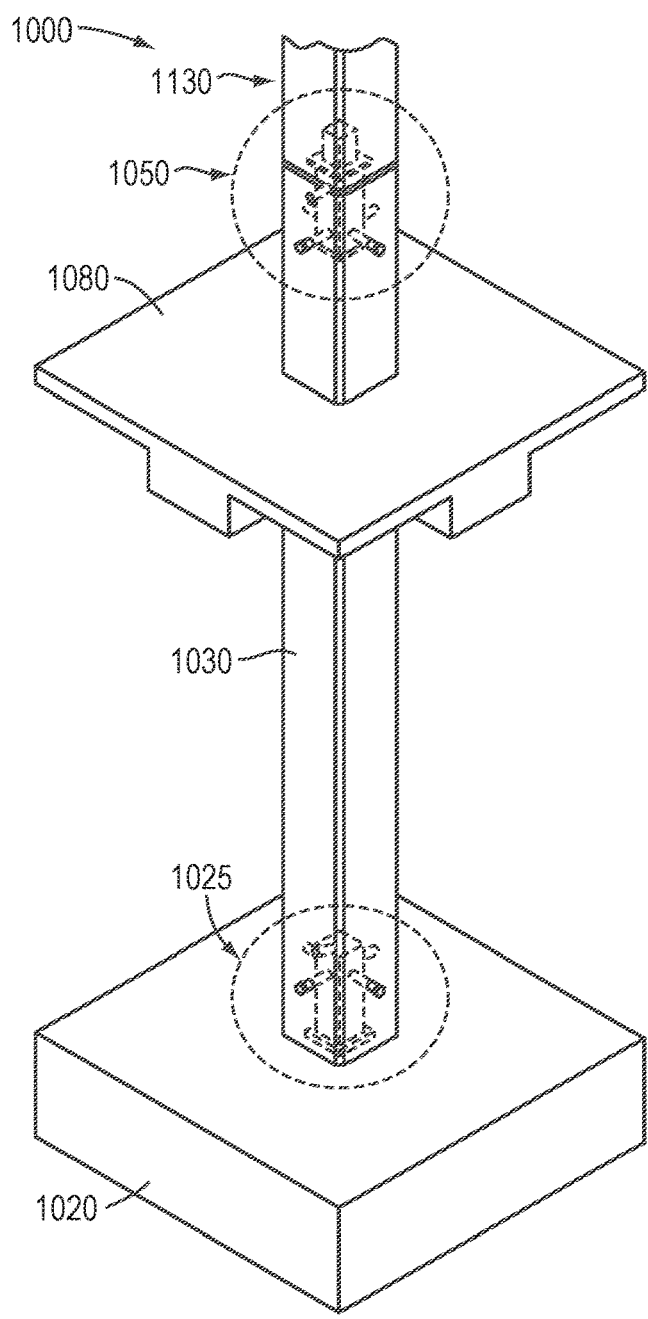
FIG. 19 is a perspective view of a fourth embodiment of the joint between the leg and the foundation.

FIG. 19 shows another embodiment of the present invention. Structure 1000 includes foundation 1020, leg 1030, deck 1080 and upper leg 1130. Foundation 1020 is connected to leg 103 by splice 1025. Leg 1030 is connected to upper leg 1130 by splice 1090. Deck 1080 may be used to support pipes, planking for building a floor, or any other structure.

Figure 20:
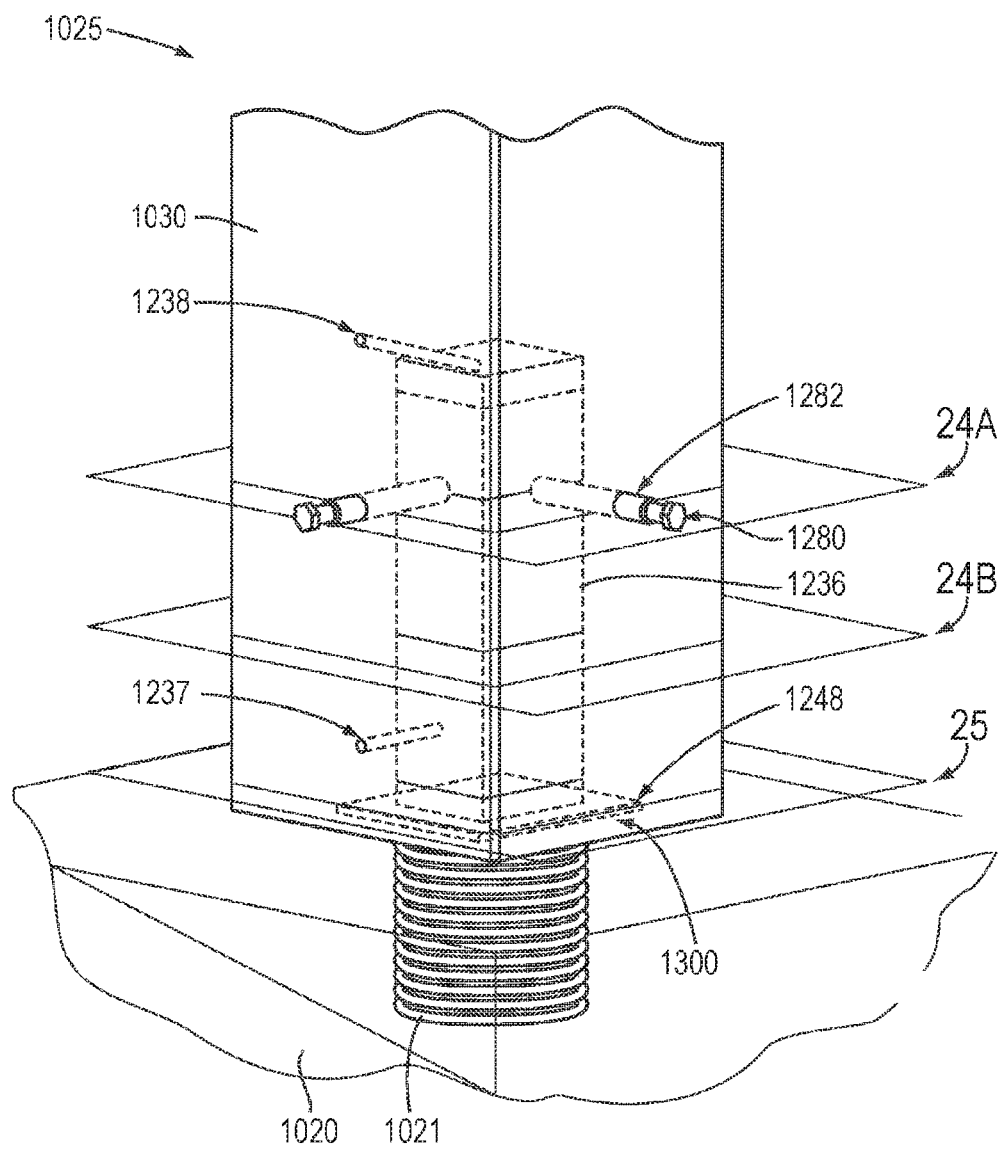
FIG. 20 is a perspective view of a fourth embodiment of the joint between the leg and the foundation.
Figure 21:
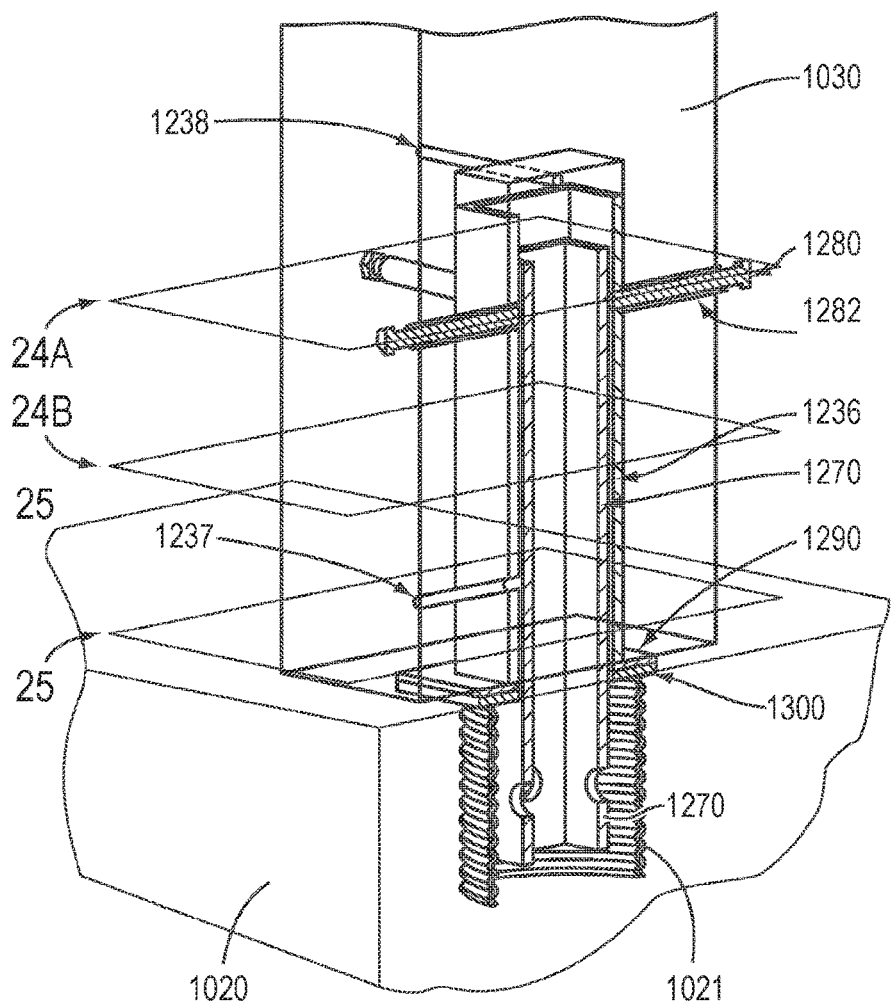
FIG. 21 is a perspective view of a fourth embodiment of the joint between the leg and the foundation.
Figure 27:
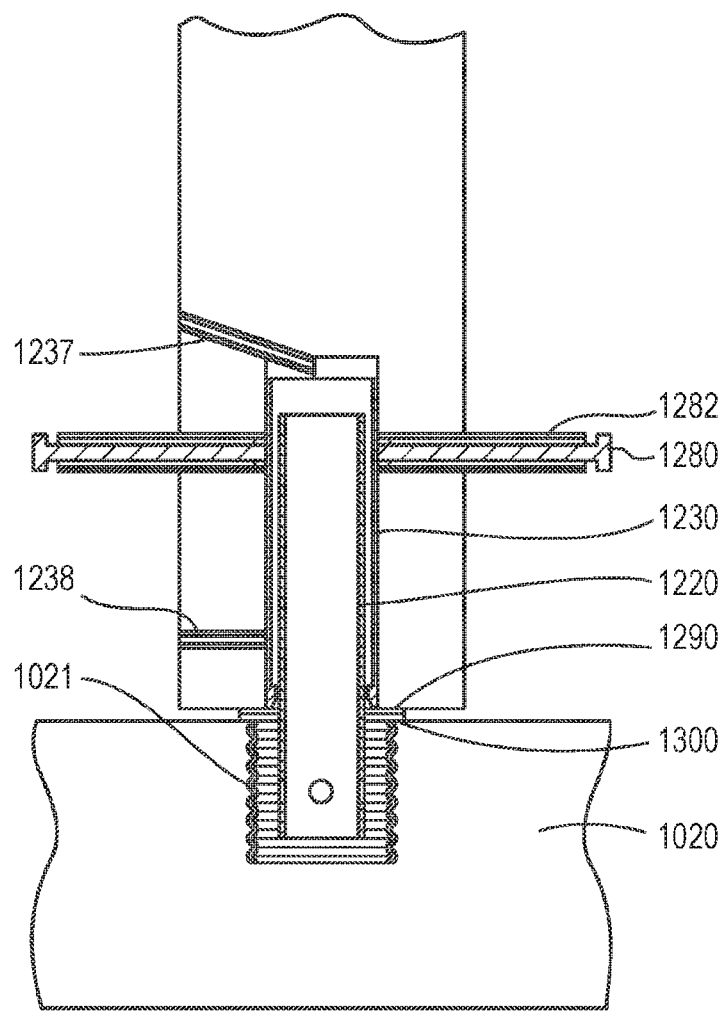
FIG. 27 is a cutaway view of an embodiment of the joint between the leg and the foundation.

FIG. 20 shows a close up of splice 1025. Foundation 1020 includes an aperture 1021, which in one embodiment may be made by a corrugated duct cast into the precast foundation 1020. Leg 1030 includes inner rod 1236 which is the outer bound of a volume filled with grout. The grout enters the volume through grout entry 1237 and excess grout exits through grout outlet 1238. Each face of leg 1030 includes a passage 1282 through which a bolt 1280 passes. These bolts are used to plumb the leg 1030 as noted hereinafter. FIG. 21 shows a perspective cutaway view of this joint between the foundation and the leg and FIG. 27 shows a side cutaway view.

Figure 22:
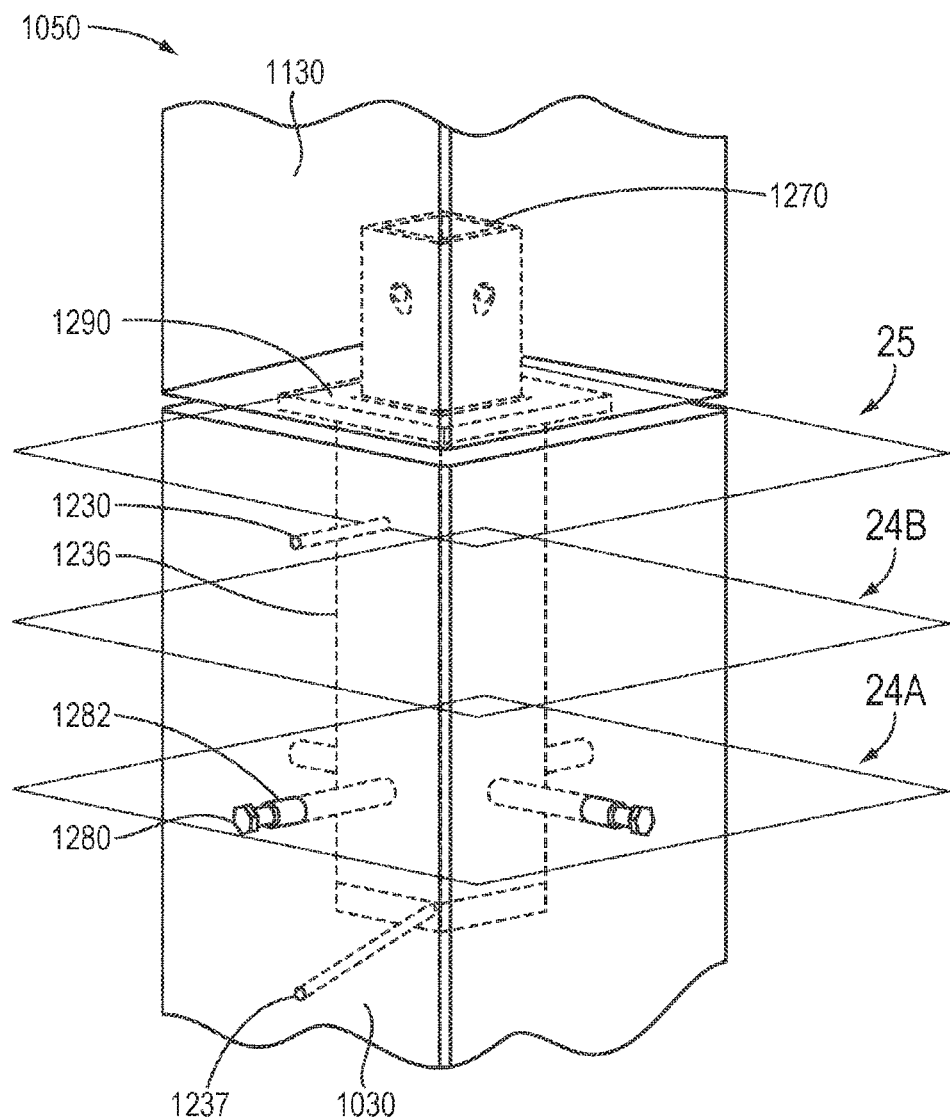
FIG. 22 is a perspective view of an embodiment of a joint between the leg and an upper column.
Figure 23:
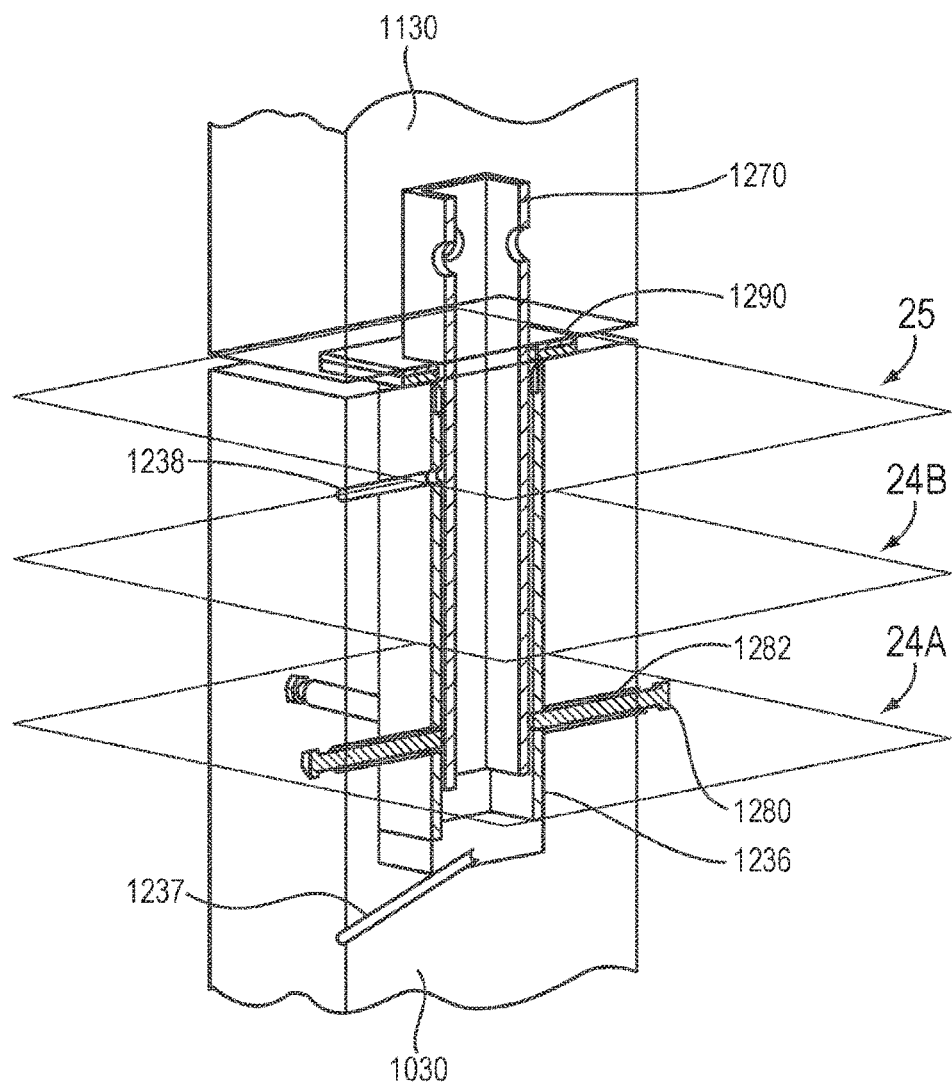
FIG. 23 is a perspective view of the embodiment of the joint between the leg and the upper column.
Figure 28:
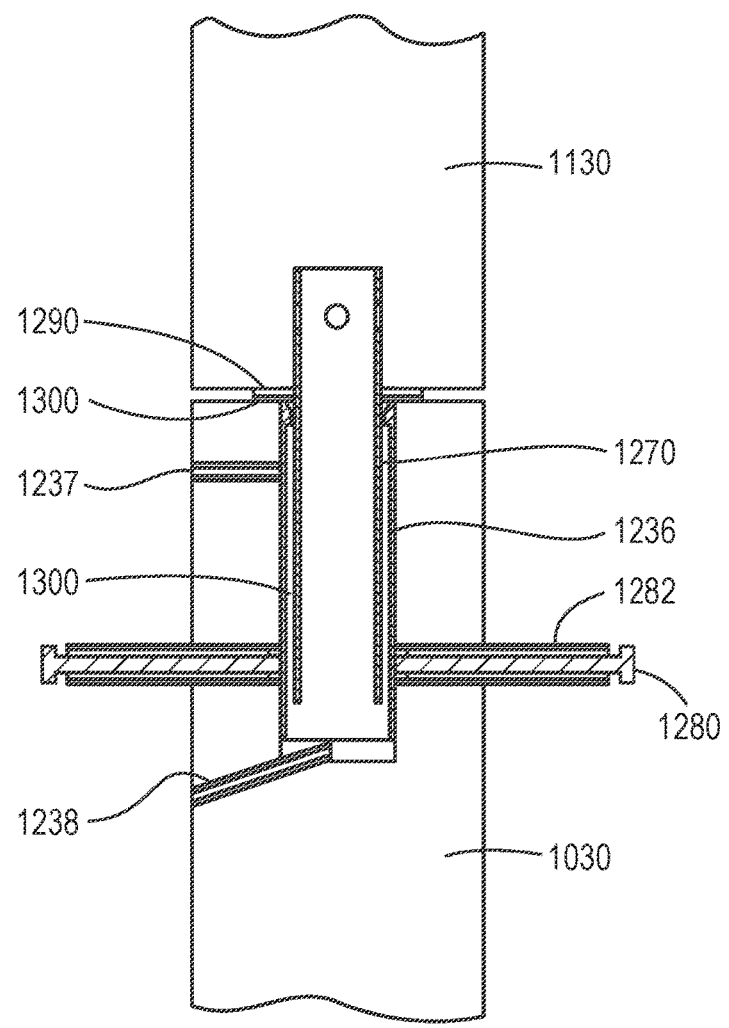
FIG. 28 is a cutaway view of an embodiment of a joint between the leg and an upper column.

FIG. 22 shows a perspective view of joint 1050 between leg 1030 and upper column 1130. This allows the structure to be built in several stages, allowing greater height for additional structures. Joint 1050 also includes a rod 1270 that is inserted in an aperture in the bottom of upper column 1130. The top of leg 1030 includes inner rod 1236 which is the outer bound of a volume filled with grout. Inner rod is precast within the upper portion of leg 1030. The grout enters the volume through grout entry 1237 and excess grout exits through grout outlet 1238. Each face of leg 1030 includes a passage 1282 through which a bolt 1280 passes. These bolts are used to plumb the leg 1030 and upper column 1120 as noted hereinafter. FIG. 23 shows a perspective cutaway view of this joint between the leg and the upper column and FIG. 28 shows a side cutaway view.

Figure 24A:
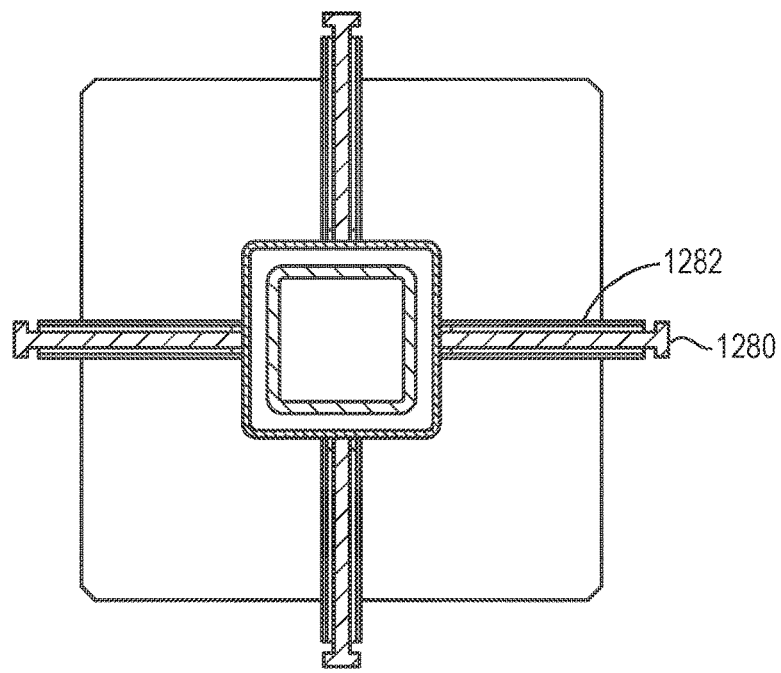
FIGS. 24A and 24B are cross sectional views of the third embodiment of the joint between the leg and the upper column.
Figure 24B:
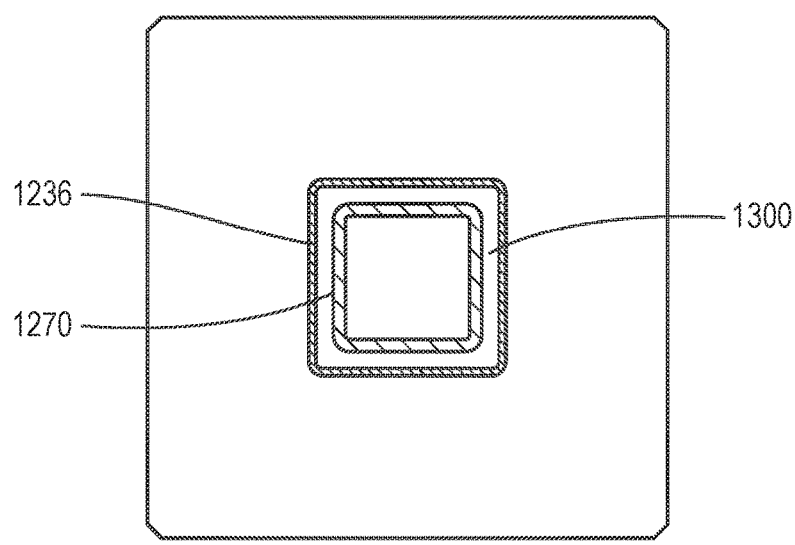
Figure 25:
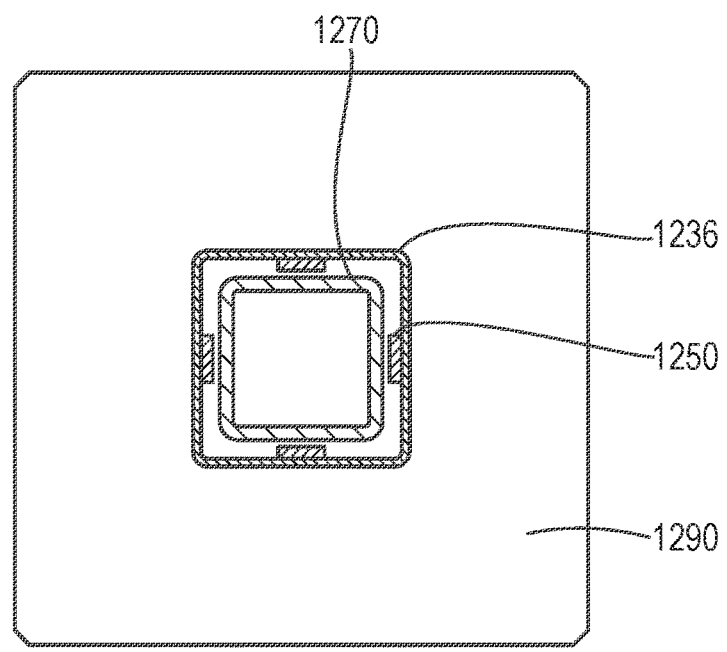
FIG. 25 is a cross sectional view of the third embodiment of the joint between the leg and the upper column.

FIGS. 24A, 24B, and 25 are cross sectional views taken of the structure shown in FIGS. 20-23. FIG. 25 also shows lugs 1250 welded to rod 1236 near the lower end of rod 1236.

Figure 26A:
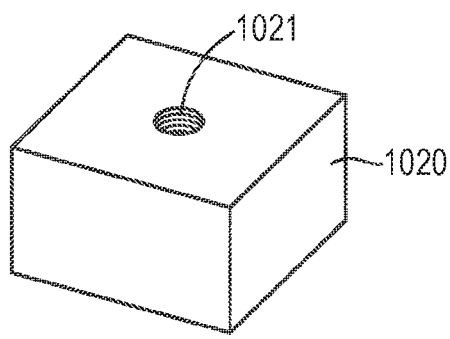
FIGS. 26A-E are views of a third embodiment of a method for making the joint between the leg and the foundation.
Figure 26B:
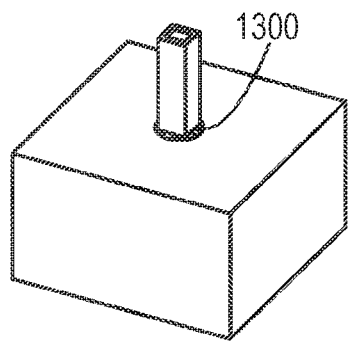
Figure 26C:
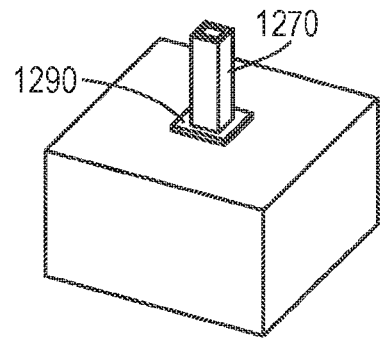
Figure 26D:
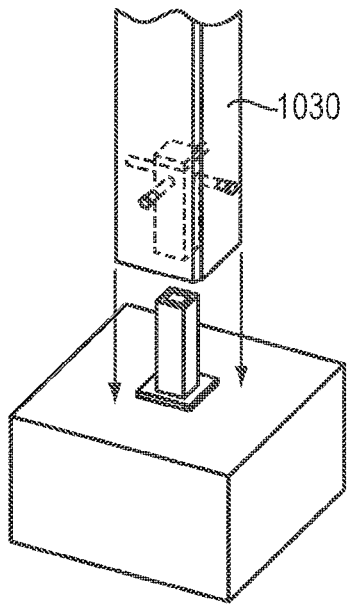
Figure 26E:
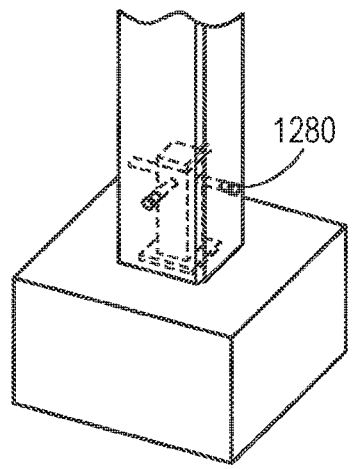

FIGS. 26A-E illustrate one method of making joint 1025 (joint 1050 is made in a similar manner). First, foundation 1020 is placed with aperture 1021 therein, as shown in FIG. 26A. Rod 1270 is placed within aperture 1021 and grout 1300 is placed surrounding the rod 1270, as shown in FIG. 26B. FIG. 26C shows that bearing plate 1290 is placed over the grout to maintain the grout in the desired configuration. FIG. 26D shows leg 1030 being placed over rod 1270. FIG. 26E shows that bolts 1280 may then be tightened into passages 1282 to contact the rod 1270 to change the angle of the leg 1030 with respect to foundation 1020. This allows the leg 1030 to be quickly and easily plumbed with respect to foundation 1020. Finally, grout is pumped through grout entry 1237 to fill the empty volume within leg 1030 to solidify the joint.

Accordingly, pipe racks that are impervious to fire may be constructed with less labor and more adjustability, reducing cost and improving performance. Therefore, a substantial cost savings may be gained by using the present method and apparatus for constructing pipe racks.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A structure comprising:
   at least one foundation defining an aperture on an upper surface of the at least one foundation;
   two legs, one of the two legs being supported by the at least one foundation, a lower surface of each of the two legs defining at least one aperture;
   a horizontal support having two ends, a first end disposed in an aperture defined in a first leg of the two legs and a second end of the horizontal support disposed in an aperture defined in a second leg of the two legs;
   a first rod forming a joint between the at least one foundation and one of the two legs, the first rod disposed in the aperture in the upper surface of the at least one foundation and in the aperture defined by the lower surface of said one of the two legs;
   a second rod disposed within the aperture defined in the lower surface of one of the two legs, wherein the second rod defines a hollow space and receives the first rod within the hollow space; and
   a passage defined through a side of the one of the two legs and through a hole in the second rod, the passage being threaded such that a distal end of a threaded bolt can be advanced into the passage to contact a side of the first rod within the hollow space of the second rod and move the first rod relative to the second rod.

2. The structure according to claim 1, wherein:
   a first hole is defined through a side of the one of the two legs, the first hole being in communication with the hollow space defined by the second rod.

3. The structure according to claim 2, wherein:
   a second hole is defined through a side of the one of the two legs, the second hole being in communication with the hollow space defined by the second rod.

4. The structure according to claim 1, wherein the one of the two legs has four lateral sides, each side defines a passage therethrough, and a bolt is extendable through one of the passages.

5. The structure according to claim 1, wherein a space between the first rod and the aperture in the at least one foundation is filled with an adhesive.

6. The structure according to claim 5, wherein the adhesive is grout.

7. The structure according to claim 1, wherein the hollow space between the first rod and the second rod is filled with an adhesive.

8. The structure according to claim 7, wherein the adhesive is grout.

9. The structure of claim 1, wherein the two legs and the horizontal support are a first set of two legs and horizontal support, the structure further comprising:
   at least one second foundation defining an aperture on an upper surface of the at least one second foundation;
   a second set of two legs, one of the second set of two legs being supported by the at least one second foundation, a lower surface of each of the two legs defining at least one aperture;
   a second horizontal support having two ends, a first end of the second horizontal support disposed in an aperture defined in a first leg of the second set of two legs and a second end of the second horizontal support disposed in an aperture defined in a second leg of the second set of two legs;
   a third rod forming a joint between the at least one second foundation and one of the legs of the second set of two legs, the rod disposed in the aperture in the upper surface of the at least one second foundation and in the aperture defined by the lower surface of the one of the two legs of the second set of two legs; and
   a fourth rod disposed within the aperture defined in the lower surface of each leg of the second set of two legs, wherein the fourth rod defines a hollow space and receives the third rod within the hollow space,
   wherein first and second sets of legs and the first and second horizontal members are arranged relative to each other such that a plane bisects the first and second horizontal members.

10. The structure of claim 9, wherein the first and second sets of legs and first and second horizontal supports comprise concrete.

11. The structure of claim 1, wherein the legs and horizontal support comprise concrete.

* * * * *